United States Patent
Schwarz

(10) Patent No.: US 11,599,968 B2
(45) Date of Patent: Mar. 7, 2023

(54) APPARATUS, A METHOD AND A COMPUTER PROGRAM FOR VOLUMETRIC VIDEO

(71) Applicant: Nokia Technologies Oy, Espoo (FI)

(72) Inventor: Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 45 days.

(21) Appl. No.: 16/754,715

(22) PCT Filed: Oct. 9, 2018

(86) PCT No.: PCT/FI2018/050721
§ 371 (c)(1),
(2) Date: Apr. 8, 2020

(87) PCT Pub. No.: WO2019/073117
PCT Pub. Date: Apr. 18, 2019

(65) Prior Publication Data
US 2020/0302571 A1     Sep. 24, 2020

(30) Foreign Application Priority Data

Oct. 11, 2017  (FI) ...................................... 20175893

(51) Int. Cl.
*G06T 3/00* (2006.01)
*G06T 7/11* (2017.01)
(Continued)

(52) U.S. Cl.
CPC .......... *G06T 3/0031* (2013.01); *G06T 3/4007* (2013.01); *G06T 7/11* (2017.01);
(Continued)

(58) Field of Classification Search
CPC . G06T 3/0031; G06T 7/11; G06T 7/70; G06T 3/4007; G06T 2207/20016;
(Continued)

(56) References Cited

U.S. PATENT DOCUMENTS 6,278,459 B1   8/2001 Malzbender et al.
6,330,281 B1 * 12/2001 Mann .................. H04N 19/577
                                                    375/240.12
(Continued)

FOREIGN PATENT DOCUMENTS

EP     1746839 A1    1/2007
EP     1034505 B1    11/2009
(Continued)

OTHER PUBLICATIONS

Grimson WE. A computational theory of visual surface interpolation. Philos Trans R Soc Lond B Biol Sci. Sep. 13, 1982;298(1092): 395-427. (Year: 1982).*

(Continued)

*Primary Examiner* — Ping Y Hsieh
*Assistant Examiner* — Daniella M. DiGuglielmo
(74) *Attorney, Agent, or Firm* — Harrington & Smith

(57) ABSTRACT

Embodiments for volumetric video encoding and decoding relating to one or more three-dimensional objects are disclosed. In encoding, after mapping from 3D space to 2D plane (802) a point in the 2D plane is examined (805) to determine which points of the 3D object are mapped to the same point to obtain a set of candidate points. Candidate points belonging to a same surface can be used to determine a center of mass for the surface (807). A depth value of the centre of mass is mapped to a 2D projection depth plane (808). A colour value for the centre of mass is interpolated from colour values of points of the set of surface points which are nearest neighbours of the center of mass (810), and used as the colour of the surface in the texture plane (812). Corresponding embodiments for decoding are provided.

19 Claims, 12 Drawing Sheets

(51) Int. Cl.
*G06T 7/70* (2017.01)
*G06T 3/40* (2006.01)
*H04N 19/186* (2014.01)
*H04N 19/597* (2014.01)
*H04N 19/80* (2014.01)
*H04N 13/117* (2018.01)
*H04N 13/279* (2018.01)
*H04N 13/161* (2018.01)

(52) U.S. Cl.
CPC ............. *G06T 7/70* (2017.01); *H04N 19/186* (2014.11); *H04N 19/597* (2014.11); *H04N 19/80* (2014.11); *G06T 2207/20016* (2013.01); *G06T 2207/20021* (2013.01); *H04N 13/117* (2018.05); *H04N 13/161* (2018.05); *H04N 13/279* (2018.05)

(58) Field of Classification Search
CPC .......... G06T 2207/20021; G06T 15/40; H04N 13/117; H04N 19/186; H04N 19/597; H04N 19/80; H04N 13/279; H04N 13/161
See application file for complete search history.

(56) References Cited

U.S. PATENT DOCUMENTS

| | | | |
|---|---|---|---|
| 7,889,209 | B2 | 2/2011 | Berger et al. |
| 8,737,723 | B1* | 5/2014 | Kwatra .................. G06T 7/593 382/154 |
| 2002/0113788 | A1* | 8/2002 | Bruijns .................. G06T 15/40 345/424 |
| 2003/0198290 | A1 | 10/2003 | Millin et al. |
| 2003/0198377 | A1* | 10/2003 | Ng ......................... G06V 10/10 382/154 |
| 2004/0104935 | A1 | 6/2004 | Williamson et al. |
| 2012/0328200 | A1 | 12/2012 | Liu et al. |
| 2013/0229485 | A1* | 9/2013 | Rusanovskyy ........ H04N 19/52 348/43 |
| 2014/0294061 | A1* | 10/2014 | Zhang ................... H04N 19/70 375/240.02 |
| 2017/0244948 | A1 | 8/2017 | Pang et al. |
| 2017/0371237 | A1* | 12/2017 | Lin ...................... H04N 9/3185 |

FOREIGN PATENT DOCUMENTS

| | | | |
|---|---|---|---|
| WO | 99/18537 | A1 | 4/1999 |
| WO | 2015/172227 | A1 | 11/2015 |
| WO | WO-2015172227 | A1 * | 11/2015 .......... G06T 19/006 |
| WO | 2016/065063 | A1 | 4/2016 |
| WO | 2019/034807 | A1 | 2/2019 |
| WO | 2019/034808 | A1 | 2/2019 |

OTHER PUBLICATIONS

Chun et al., "Directional 3-D Interpolation Technique for Volume Rendering", IEEE Nuclear Science Symposium and Medical Imaging Conference, Nov. 2-9, 1991, pp. 2145-2148.

Ji et al., "Real-time Interpolation for True 3-Dimensional Ultrasound Image Volumes", Journal of ultrasound in medicine: official journal of the American Institute of Ultrasound in Medicine, vol. 30, No. 2, 2011, pp. 243-252.

Mekuria et al., "Design, Implementation and Evaluation of a Point Cloud Codec for Tele-Immersive Video", IEEE Transactions on Circuits and Systems for Video Technology, vol. 27, No. 4, Apr. 2017, pp. 828-842.

"Google Draco", Github, Retrieved on Feb. 7, 2020, Webpage available at: https://github.com/google/draco.

Mamou et al., "FAMC: The MPEG-4 Standard for Animated Mesh Compression", IEEE International Conference on Image Processing, Oct. 12-15, 2008, pp. 2676-2679.

"Call for Proposals for Point Cloud Compression V2", ISO/IEC JTC1/SC29/WG11 MPEG2017/N16763, Apr. 2017, 21 pages.

Zhang et al., "Interpolation-Dependent Image Downsampling", IEEE Transactions on Image Processing, vol. 20, No. 11, Nov. 2011, pp. 3291-3296.

Yang et al., "Universal Chroma Subsampling Strategy for Compressing Mosaic Video Sequences With Arbitrary RGB Color Filter Arrays in H.264/AVC", IEEE Transactions on Circuits and Systems for Video Technology, vol. 23, No. 4, Apr. 2013, pp. 591-606.

"Information technology—Dynamic adaptive streaming over HTTP (DASH)", Part 1: Media presentation description and segment formats, International Standard ISO/IEC 23009-1, Apr. 1, 2015, pp. 1-56.

Office action received for corresponding Finnish Application No. 20175893, dated Jun. 11, 2018, 8 pages.

Wang et al., "Accurate Full Body Scanning from a Single Fixed 3D Camera", Second International Conference on 3D Imaging, Modeling, Processing, Visualization & Transmission, Oct. 13-15, 2012, pp. 432-439.

Quynh et al., "Modeling 3D Articulated Motions with Conformal Geometry Videos (CGVs)", Proceedings of the 19th International Conference on Multimedia, 2011, pp. 383-392.

Habe et al., "Skin-off: Representation and Compression Scheme for 3D Video", Proceedings of Picture Coding Symposium, Dec. 2004, 6 pages.

International Search Report and Written Opinion received for corresponding Patent Cooperation Treaty Application No. PCT/FI2018/050721, dated Jan. 15, 2019, 20 pages.

Extended European Search Report received for corresponding European Application No. 18866518.6, dated May 31, 2021, 17 pages.

* cited by examiner

APPARATUS, A METHOD AND A COMPUTER PROGRAM FOR VOLUMETRIC VIDEO

RELATED APPLICATION

This application claims priority to PCT Application No. PCT/FI2018/050721, filed on Oct. 9, 2018, which claims priority to FI Application No. 20175893, filed on Oct. 11, 2017, each of which is incorporated herein by reference in its entirety.

TECHNICAL FIELD

The present invention relates to an apparatus, a method and a computer program for content dependent projection for volumetric video coding and decoding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Volumetric video data represents a three-dimensional scene or object and can be used as input for virtual reality (VR), augmented reality (AR) and mixed reality (MR) applications. Such data describes the geometry, e.g. shape, size, position in three-dimensional (3D) space, and respective attributes, e.g. colour, opacity, reflectance and any possible temporal changes of the geometry and attributes at given time instances, comparable to frames in two-dimensional (2D) video. Volumetric video is either generated from 3D models through computer-generated imagery (CGI), or captured from real-world scenes using a variety of capture solutions, e.g. multi-camera, laser scan, combination of video and dedicated depth sensors, and more. Also, a combination of CGI and real-world data is possible.

Typical representation formats for such volumetric data are triangle meshes, point clouds (PCs), or voxel arrays. Temporal information about the scene can be included in the form of individual capture instances, i.e. "frames" in 2D video, or other means, e.g. position of an object as a function of time.

Because volumetric video describes a 3D scene (or object), it may be possible to view such data from any viewpoint. Therefore, volumetric video may be a usable format for any AR, VR, or MR applications, especially for providing six degrees-of-freedom (6DOF) viewing capabilities.

The above mentioned volumetric video representation formats suffer from poor spatial and temporal coding performance. Identifying correspondences for motion-compensation in 3D-space is an ill-defined problem, as both, geometry and respective attributes may change. For example, temporal successive "frames" do not necessarily have the same number of meshes, points or voxel. Therefore, compression of dynamic 3D scenes is inefficient. 2D-video based approaches for compressing volumetric data, i.e. multiview+depth, have much better compression efficiency, but rarely cover the full scene. Therefore, they provide only limited 6DOF capabilities.

There is, therefore, a need for solutions for improved coding of volumetric video.

SUMMARY

Now there has been invented an improved method and technical equipment implementing the method, by which the above problems are alleviated. Various aspects of the invention include a method, an apparatus (an encoder and/or a decoder), a system and a computer readable medium comprising a computer program or a signal stored therein, which are characterized by what is stated in the independent claims. Various details of the invention are disclosed in the dependent claims and in the corresponding images and description.

A volumetric video, for example dynamic point clouds, arrays of voxels or mesh models or a combination of such, may be projected onto a number of projection surfaces having simple geometries, for example sphere(s), cylinder(s), cube(s), polyhedron(s) and/or plane(s). In this context, a projection surface may be a piece-wise continuous and smooth surface in three-dimensional space. Piece-wise smoothness may be understood so that there are regions of the surface where the direction of the surface normal does not change abruptly (i.e. the values of the coefficients of the surface normal's coordinate components are continuous). A projection surface may comprise pieces of simple geometric surfaces. A projection surface may also evolve (change) over time. On such surfaces, the texture and geometry of point clouds, voxel arrays or mesh models may form pixel images, e.g. texture images and depth images (indicative of distance from the projection plane). Such projection surfaces may be unfolded onto two-dimensional (2D) planes, e.g. resulting in a two-dimensional pixel image. Standard 2D video coding may be applied for each projection to code the pixel information resulting from the texture data. In connection with the texture information, relevant projection geometry information, comprising e.g. projection or projection surface type, location and orientation of the projection surface in 3D space, and/or size of the projection surface, may be transmitted either in the same bitstream or separately along the bitstream. At the receiver side, the bitstream may be decoded and volumetric video may be reconstructed from decoded 2D projections and projection geometry information. At the decoder side the format need not necessarily be the same than the format used at the encoder side. FIG. 6a illustrates this process for a cylinder-projection of a volumetric video comprising a single person.

In an encoding method, a bitstream may be encoded or encapsulated, the bitstream comprising one or more coded texture pictures and one or more coded depth pictures. Each texture picture may represent a 2D projection of 3D data onto a given geometry and each depth picture may represent depth data of pixels of the texture picture.

In a decoding method, a bitstream comprising one or more coded texture picture(s) and one or more coded depth pictures may be received and decoded. The texture picture represents a two-dimensional projection of three-dimensional data onto a projection surface with a given geometry and the depth pictures represents depth data of pixels of the texture picture. A geometry picture may represent geometry data, e.g. depth from the projection surface. Additional auxiliary pictures may represent further attributes, e.g. surface normal, reflectance, opacity, etc. as described earlier. Relevant projection information may also be decoded from or along a bitstream. From this decoded information, a 3D scene may be reconstructed accordingly.

Some embodiments provide a method for encoding and decoding volumetric video information. In some embodiments of the present invention there is provided a method, apparatus and computer program product for volumetric video coding as well as decoding.

Various aspects of examples of the invention are provided in the detailed description.

According to a first aspect, there is provided a method comprising:

obtaining volumetric video data containing information of one or more three-dimensional objects;

mapping the one or more three-dimensional objects to a two-dimensional plane with a certain vertical and horizontal resolution;

examining a point in the two-dimensional plane to determine which points of the three-dimensional object are mapped to the same point to obtain a set of candidate points;

determining which points of the set of candidate points belong to a same surface to obtain a set of surface points;

determining a centre of mass for the surface on the basis of points of the set of surface points;

mapping a depth value of the centre of mass to a depth plane representing a two-dimensional projection plane of depth data of the three-dimensional object;

interpolating a colour value for the centre of mass from colour values of points of the set of surface points which are nearest neighbours of the centre of mass; and using the interpolated colour value as the colour of the surface in the texture plane.

An apparatus according to a second aspect comprises at least one processor and at least one memory, said at least one memory stored with code thereon, which when executed by said at least one processor, causes the apparatus to perform at least:

obtain volumetric video data containing information of one or more three-dimensional objects;

map the one or more three-dimensional objects to a two-dimensional plane with a certain vertical and horizontal resolution;

examine a point in the two-dimensional plane to determine which points of the three-dimensional object are mapped to the same point to obtain a set of candidate points;

determine which points of the set of candidate points belong to a same surface to obtain a set of surface points;

determine a centre of mass for the surface on the basis of points of the set of surface points;

map a depth value of the centre of mass to a depth plane representing a two-dimensional projection plane of depth data of the three-dimensional object; and interpolate a colour value for the centre of mass from colour values of points of the set of surface points which are nearest neighbours of the centre of mass; and use the interpolated colour value as the colour of the surface in the texture plane.

A computer readable storage medium according to a third aspect comprises code for use by an apparatus, which when executed by a processor, causes the apparatus to perform:

obtain volumetric video data containing information of one or more three-dimensional objects;

map the one or more three-dimensional objects to a two-dimensional plane with a certain vertical and horizontal resolution;

examine a point in the two-dimensional plane to determine which points of the three-dimensional object are mapped to the same point to obtain a set of candidate points;

determine which points of the set of candidate points belong to a same surface to obtain a set of surface points;

determine a centre of mass for the surface on the basis of points of the set of surface points;

map a depth value of the centre of mass to a depth plane representing a two-dimensional projection plane of depth data of the three-dimensional object; and interpolate a colour value for the centre of mass from colour values of points of the set of surface points which are nearest neighbours of the centre of mass; and use the interpolated colour value as the colour of the surface in the texture plane.

An apparatus according to a fourth aspect comprises:

means for obtaining volumetric video data containing information of one or more three-dimensional objects;

means for mapping the one or more three-dimensional objects to a two-dimensional plane with a certain vertical and horizontal resolution;

means for examining a point in the two-dimensional plane to determine which points of the three-dimensional object are mapped to the same point to obtain a set of candidate points;

means for determining which points of the set of candidate points belong to a same surface to obtain a set of surface points;

means for determining a centre of mass for the surface on the basis of points of the set of surface points;

means for mapping a depth value of the centre of mass to a depth plane representing a two-dimensional projection plane of depth data of the three-dimensional object;

means for interpolating a colour value for the centre of mass from colour values of points of the set of surface points which are nearest neighbours of the centre of mass; and means for using the interpolated colour value as the colour of the surface in the texture plane.

According to a fifth aspect, there is provided a method comprising:

receiving coded texture data representing a texture plane of a three-dimensional object in volumetric video data;

receiving coded depth data representing a depth plane of the three-dimensional object in volumetric video data;

selecting a first pixel from one of the texture plane or the depth plane;

selecting a second pixel from the same plane;

comparing coded depth data of the first pixel with coded depth data of the second pixel to determine whether the first pixel and the second pixel belong to a same surface of the object;

if the comparison indicates that the first pixel and the second pixel belong to a same surface of the object, the method comprises:

reconstructing three-dimensional points between a first three-dimensional point represented by the first pixel and a second three-dimensional point represented by the second pixel in the texture plane by interpolating texture values of the first pixel and the second pixel; and reconstructing three-dimensional points between the first three-dimensional point and the second three-dimensional point in the depth plane by interpolating geometry values of the first three-dimensional point and the second three-dimensional point.

According to a sixth aspect, there is provided an apparatus according to a second aspect comprises at least one processor and at least one memory, said at least one memory stored with code thereon, which when executed by said at least one processor, causes the apparatus to perform at least:

receive coded texture data representing a texture plane of a three-dimensional object in volumetric video data;

receive coded depth data representing a depth plane of the three-dimensional object in volumetric video data;

select a first pixel from one of the texture plane or the depth plane;

select a second pixel from the same plane;

compare coded depth data of the first pixel with coded depth data of the second pixel to determine whether the first pixel and the second pixel belong to a same surface of the object;

reconstruct three-dimensional points between a first three-dimensional point represented by the first pixel and a second three-dimensional point represented by the second pixel in the texture plane by interpolating texture values of the first pixel and the second pixel; and reconstruct three-dimensional points between the first three-dimensional point and the second three-dimensional point in the depth plane by interpolating geometry values of the first three-dimensional point and the second three-dimensional point, if the comparison indicates that the first pixel and the second pixel belong to a same surface of the object.

According to a seventh aspect, there is provided a computer readable storage medium according to a third aspect comprises code for use by an apparatus, which when executed by a processor, causes the apparatus to perform:

receive coded texture data representing a texture plane of a three-dimensional object in volumetric video data;

receive coded depth data representing a depth plane of the three-dimensional object in volumetric video data;

select a first pixel from one of the texture plane or the depth plane;

select a second pixel from the same plane;

compare coded depth data of the first pixel with coded depth data of the second pixel to determine whether the first pixel and the second pixel belong to a same surface of the object;

reconstruct three-dimensional points between a first three-dimensional point represented by the first pixel and a second three-dimensional point represented by the second pixel in the texture plane by interpolating texture values of the first pixel and the second pixel; and reconstruct three-dimensional points between the first three-dimensional point and the second three-dimensional point in the depth plane by interpolating geometry values of the first three-dimensional point and the second three-dimensional point, if the comparison indicates that the first pixel and the second pixel belong to a same surface of the object.

According to an eighth aspect, there is provided an apparatus comprising:

means for receiving coded texture data representing a texture plane of a three-dimensional object in volumetric video data;

means for receiving coded depth data representing a depth plane of the three-dimensional object in volumetric video data;

means for selecting a first pixel from one of the texture plane or the depth plane;

means for selecting a second pixel from the same plane;

means for comparing coded depth data of the first pixel with coded depth data of the second pixel to determine whether the first pixel and the second pixel belong to a same surface of the object;

means for reconstructing three-dimensional points between a first three-dimensional point represented by the first pixel and a second three-dimensional point represented by the second pixel in the texture plane by interpolating texture values of the first pixel and the second pixel; and reconstructing three-dimensional points between the first three-dimensional point and the second three-dimensional point in the depth plane by interpolating geometry values of the first three-dimensional point and the second three-dimensional point, if the comparison indicates that the first pixel and the second pixel belong to a same surface of the object.

Further aspects include at least apparatuses and computer program products/code stored on a non-transitory memory medium arranged to carry out the above methods.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

In the following, several embodiments of the invention will be described in the context of point cloud, voxel or mesh scene models for three-dimensional volumetric video and pixel and picture based two-dimensional video coding. It is to be noted, however, that the invention is not limited to specific scene models or specific coding technologies. In fact, the different embodiments have applications in any environment where coding of volumetric scene data is required.

In the projection-based volumetric video coding approach, a volumetric video is represented by at least one texture image and at least one depth image plane. The spatial resolution of each plane defines the number of available points for reconstruction, thus the detail level and quality of the reconstructed volumetric video at the receiver's side. Though, the spatial resolution of each plane also directly affects the required bit rate to encode and transmit the volumetric video. Obviously, lower spatial resolutions require less bit rate. As volumetric video objects typically describe coherent, piece-wise smooth surfaces, it is only logical to transmit lower resolution projection planes and upsample the volumetric video content at the receiver's side, i.e. increase detail by closing surfaces or interpolating 3D points between known values.

Some 3D interpolation approaches can be utilised for this upsampling step. However, reconstruction quality can be drastically improved by amending the preceding downsampling step in the 3D→2D conversion to better represent the unique 3D→2D→3D processing chain applied in projection-based volumetric video.

Finally, reflecting such a dedicated downsampling approach during the reconstruction upsampling closes the loop and provides optimised coding efficiency for volumetric video compression.

When encoding a volumetric video, each frame may produce several hundred megabytes or several gigabytes of voxel data which needs to be converted to a format that can be streamed to the viewer, and rendered in real-time. The amount of data depends on the world complexity and the number of cameras. The larger impact comes in a multi-device recording setup with a number of separate locations where the cameras are recording. Such a setup produces more information than a camera at a single location.

Figure 1:
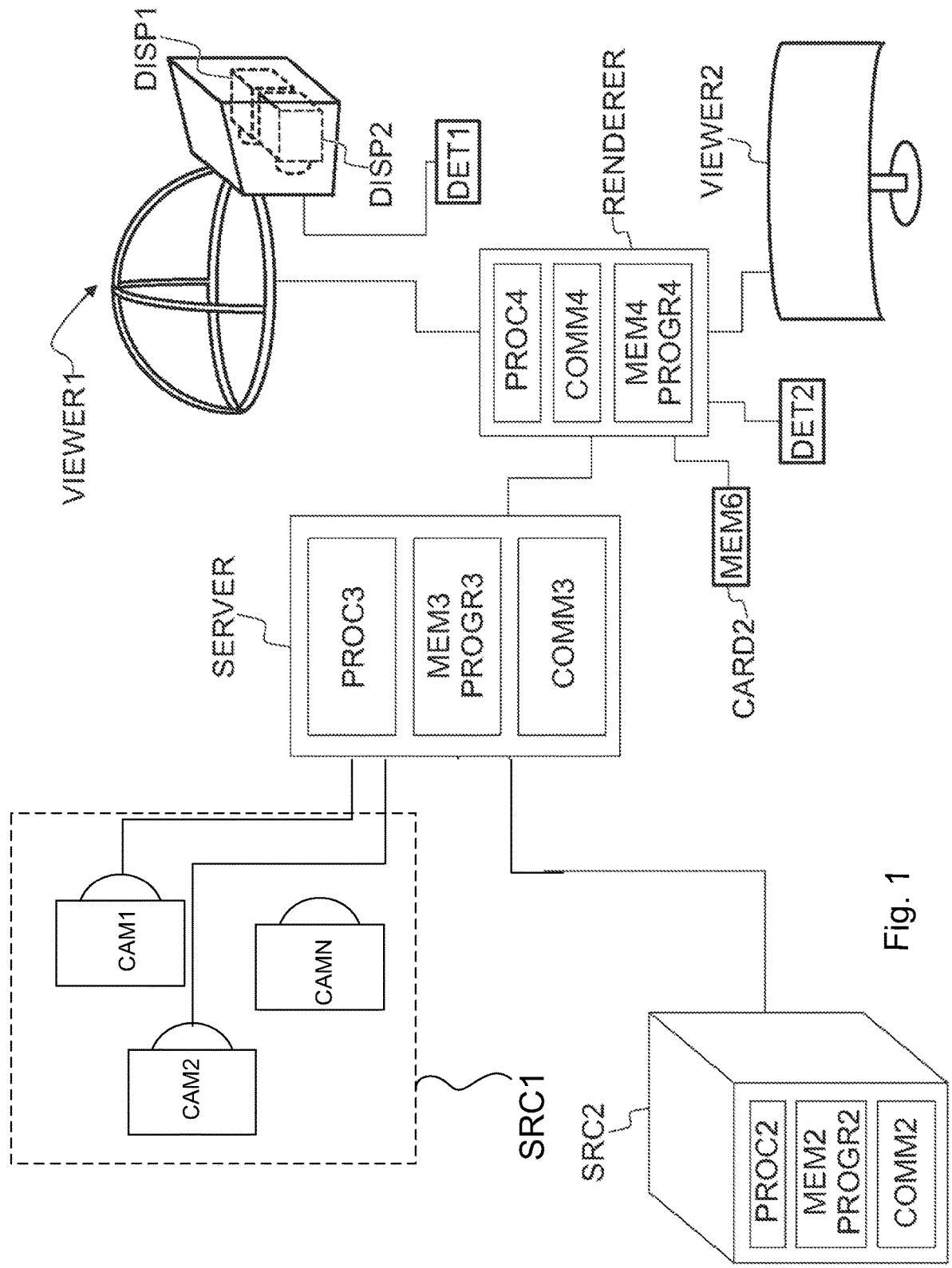
FIG. 1 shows a system for capturing, encoding, decoding, reconstructing and viewing a three-dimensional scheme.

FIG. 1 shows a system for capturing, encoding, decoding, reconstructing and viewing a three-dimensional scheme, that is, for 3D video and 3D audio digital creation and playback. The task of the system is that of capturing sufficient visual and auditory information from a specific scene to be able to create a scene model such that a convincing reproduction of the experience, or presence, of being in that location can be achieved by one or more viewers physically located in different locations and optionally at a time later in the future. Such reproduction requires more information that can be captured by a single camera or microphone, in order that a viewer can determine the distance and location of objects within the scene using their eyes and their ears. To create a pair of images with disparity, two camera sources are used. In a similar manner, for the human auditory system to be able to sense the direction of sound, at least two microphones are used (the commonly known stereo sound is created by recording two audio channels). The human auditory system can detect the cues, e.g. in timing difference of the audio signals to detect the direction of sound.

The system of FIG. 1 may consist of three main parts: image sources, a server and a rendering device. A video source SRC1 may comprise multiple cameras CAM1, CAM2, . . . , CAMN with overlapping field of view so that regions of the view around the video capture device is captured from at least two cameras. The video source SRC1 may comprise multiple microphones to capture the timing and phase differences of audio originating from different directions. The video source SRC1 may comprise a high-resolution orientation sensor so that the orientation (direction of view) of the plurality of cameras CAM1, CAM2, . . . , CAMN can be detected and recorded. The cameras or the computers may also comprise or be functionally connected to means for forming distance information corresponding to the captured images, for example so that the pixels have corresponding depth data. Such depth data may be formed by scanning the depth or it may be computed from the different images captured by the cameras. The video source SRC1 comprises or is functionally connected to, or each of the plurality of cameras CAM1, CAM2, . . . , CAMN comprises or is functionally connected to a computer processor and memory, the memory comprising computer program code for controlling the source and/or the plurality of cameras. The image stream captured by the video source, i.e. the plurality of the cameras, may be stored on a memory device for use in another device, e.g. a viewer, and/or transmitted to a server using a communication interface. It needs to be understood that although a video source comprising three cameras is described here as part of the system, another amount of camera devices may be used instead as part of the system.

Alternatively or in addition to the source device SRC1 creating information for forming a scene model, one or more sources SRC2 of synthetic imagery may be present in the system, comprising a scene model. Such sources may be used to create and transmit the scene model and its development over time, e.g. instantaneous states of the model. The model can be created or provided by the source SRC1 and/or SRC2, or by the server SERVER. Such sources may also use the model of the scene to compute various video bitstreams for transmission.

One or more two-dimensional video bitstreams may be computed at the server SERVER or a device RENDERER used for rendering, or another device at the receiving end. When such computed video streams are used for viewing, the viewer may see a three-dimensional virtual world as described in the context of FIGS. 4a-4d. The devices SRC1 and SRC2 may comprise or be functionally connected to one or more computer processors (PROC2 shown) and memory (MEM2 shown), the memory comprising computer program (PROGR2 shown) code for controlling the source device SRC1/SRC2. The image stream captured by the device and the scene model may be stored on a memory device for use in another device, e.g. a viewer, or transmitted to a server or the viewer using a communication interface COMM2. There may be a storage, processing and data stream serving network in addition to the capture device SRC1. For example, there may be a server SERVER or a plurality of servers storing the output from the capture device SRC1 or device SRC2 and/or to form a scene model from the data from devices SRC1, SRC2. The device SERVER comprises or is functionally connected to a computer processor PROC3 and memory MEM3, the memory comprising computer program PROGR3 code for controlling the server. The device SERVER may be connected by a wired or wireless network connection, or both, to sources SRC1 and/or SRC2, as well as the viewer devices VIEWER1 and VIEWER2 over the communication interface COMM3.

The creation of a three-dimensional scene model may take place at the server SERVER or another device by using the images captured by the devices SRC1. The scene model may be a model created from captured image data (a real-world model), or a synthetic model such as on device SRC2, or a combination of such. As described later, the scene model may be encoded to reduce its size and transmitted to a decoder, for example viewer devices.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEMO, the memory comprising computer program PROGR4 code for controlling the viewing devices. The viewer (playback) devices may consist of a data stream receiver for receiving a video data stream and for decoding the video data stream. The video data stream may be received from the server SERVER or from some other entity, such as a proxy server, an edge server of a content delivery network, or a file available locally in the viewer device. The data stream may be received over a network connection through communications interface COMM4, or from a memory device MEM6 like a memory card CARD2. The viewer devices may have a graphics processing unit for processing of the data to a suitable format for viewing. The viewer VIEWER1 may comprise a high-resolution stereo-image head-mounted display for viewing the rendered stereo video sequence. The head-mounted display may have an orientation sensor DET1 and stereo audio headphones. The viewer VIEWER2 may comprise a display (either two-dimensional or a display enabled with 3D technology for displaying stereo video), and the rendering device may have an orientation detector DET2 connected to it. Alternatively, the viewer VIEWER2 may comprise a 2D display, since the volumetric video rendering can be done in 2D by rendering the viewpoint from a single eye instead of a stereo eye pair.

It needs to be understood that FIG. 1 depicts one SRC1 device and one SRC2 device, but generally the system may comprise more than one SRC1 device and/or SRC2 device. Any of the devices (SRC1, SRC2, SERVER, RENDERER, VIEWER1, VIEWER2) may be a computer or a portable computing device, or be connected to such or configured to be connected to such. Moreover, even if the devices (SRC1, SRC2, SERVER, RENDERER, VIEWER1, VIEWER2) are depicted as a single device in FIG. 1, they may comprise multiple parts or may be comprised of multiple connected devices. For example, it needs to be understood that SERVER may comprise several devices, some of which may be used for editing the content produced by SRC1 and/or SRC2 devices, some others for compressing the edited content, and a third set of devices may be used for transmitting the compressed content. Such devices may have computer program code for carrying out methods according to various examples described in this text.

Figure 2A:
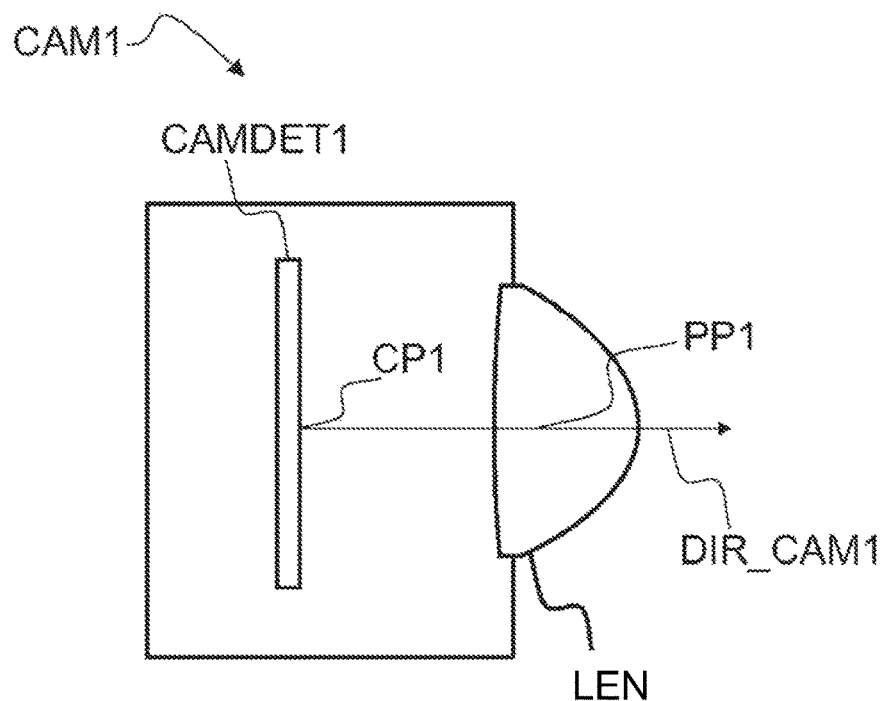
FIGS. 2a and 2b show a capture device and a viewing device.
Figure 2B:
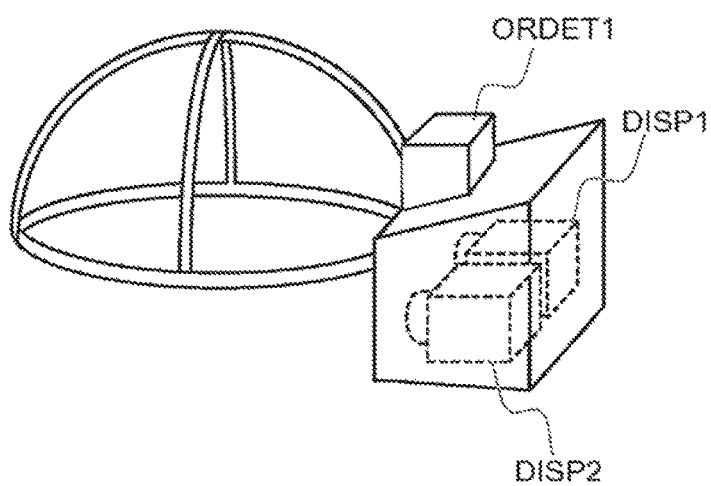

FIGS. 2a and 2b show a capture device and a viewing device, respectively. FIG. 2a illustrates a camera CAM1. The camera has a camera detector CAMDET1, comprising a plurality of sensor elements for sensing intensity of the light hitting the sensor element. The camera has a lens LEN (or a lens arrangement of a plurality of lenses), the lens being positioned so that the light hitting the sensor elements travels through the lens to the sensor elements. The camera detector CAMDET 1 has a nominal centre point CP1 that is a middle point of the plurality of sensor elements, for example for a rectangular sensor the crossing point of diagonals of the rectangular sensor. The lens has a nominal centre point PP1, as well, lying for example on the axis of symmetry of the lens. The direction of orientation of the camera is defined by the line passing through the centre point CP1 of the camera sensor and the centre point PP1 of the lens. The direction of the camera DIR CAM1 is a vector along this line pointing in the direction from the camera sensor to the lens. The optical axis of the camera is understood to be this line CP1-PP1. However, the optical path from the lens to the camera detector need not always be a straight line but there may be mirrors and/or some other elements which may affect the optical path between the lens and the camera detector.

FIG. 2b shows a head-mounted display (HMD) for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. When the device will be used by a user, the user may put the device on her/his head so that it will be attached to the head of the user so that it stays in place even when the user turns his head. The device may have an orientation detecting module ORDET1 for determining the head movements and direction of the head. The head-mounted display gives a three-dimensional (3D) perception of the recorded/streamed content to a user.

The system described above may function as follows. Time-synchronized video and orientation data is first recorded with the capture devices. This can consist of multiple concurrent video streams as described above. One or more time-synchronized audio streams may also be recorded with the capture devices. The different capture devices may form image and geometry information of the scene from different directions. For example, there may be three, four, five, six or more cameras capturing the scene from different sides, like front, back, left and right, and/or at directions between these, as well as from the top or bottom, or any combination of these. The cameras may be at different distances, for example some of the cameras may capture the whole scene and some of the cameras may be capturing one or more objects in the scene. In an arrangement used for capturing volumetric video data, several cameras may be directed towards an object, looking onto the object from different directions, where the object is e.g. in the middle of the cameras. In this manner, the texture and geometry of the scene and the objects within the scene may be captured adequately. As mentioned earlier, the cameras or the system may comprise means for determining geometry information, e.g. depth data, related to the captured video streams. From these concurrent video and audio streams, a computer model of a scene may be created. Alternatively or additionally, a synthetic computer model of a virtual scene may be used. The models (at successive time instances) are then transmitted immediately or later to the storage and processing network for processing and conversion into a format suitable for subsequent delivery to playback devices. The conversion may involve processing and coding to improve the quality and/or reduce the quantity of the scene model data while preserving the quality at a desired level. Each playback device receives a stream of the data (either computed video data or scene model data) from the network, and renders it into a viewing reproduction of the original location which can be experienced by a user. The reproduction may be two-dimensional or three-dimensional (stereo image pairs).

Figure 3A:
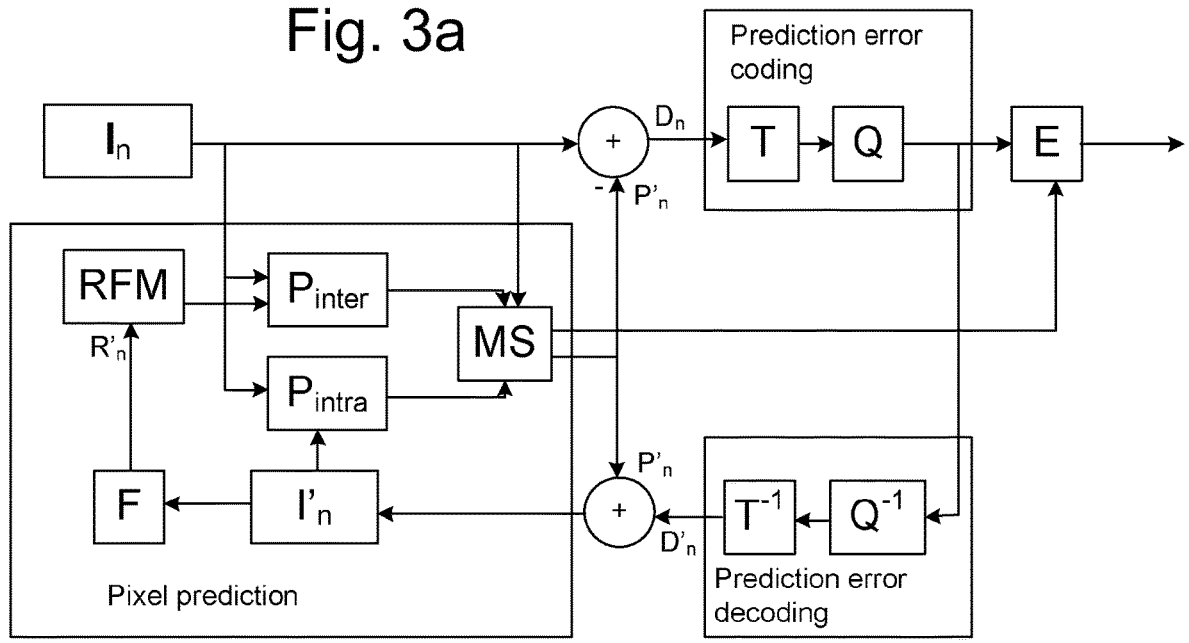
FIGS. 3a and 3b show an encoder and decoder for encoding and decoding texture pictures, geometry pictures and/or auxiliary pictures.
Figure 3B:
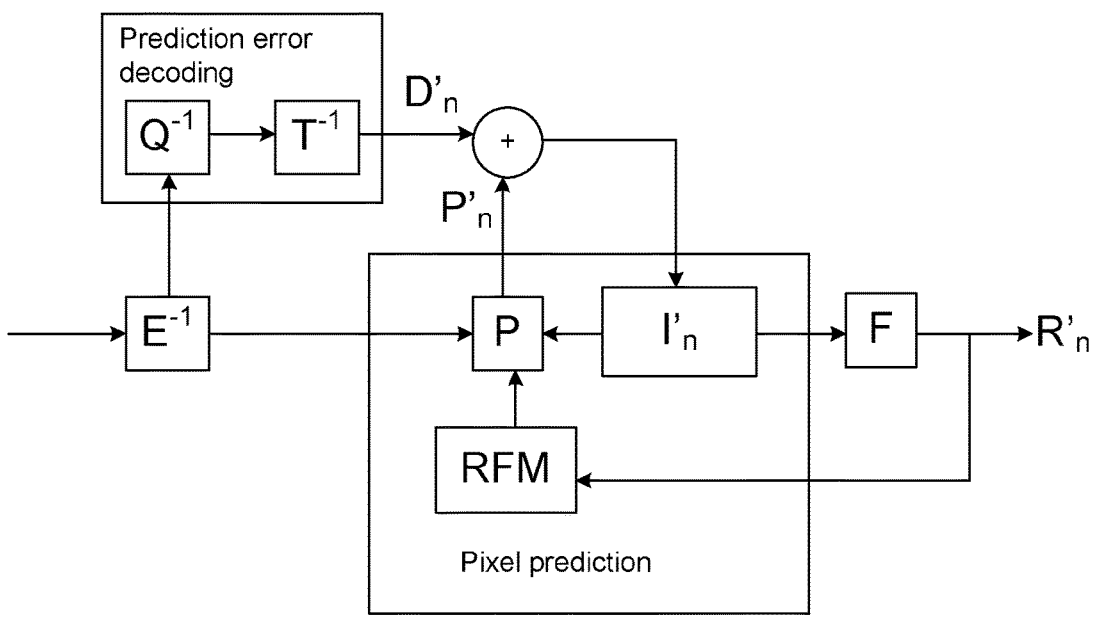

FIGS. 3a and 3b show an encoder and decoder for encoding and decoding texture pictures, geometry pictures and/or auxiliary pictures. A video codec consists of an encoder that transforms an input video into a compressed representation suited for storage/transmission and a decoder that can uncompress the compressed video representation back into a viewable form. Typically, the encoder discards and/or loses some information in the original video sequence in order to represent the video in a more compact form (that is, at lower bitrate). An example of an encoding process is illustrated in FIG. 3a. FIG. 3a illustrates an image to be encoded (In); a predicted representation of an image block (P'$_n$); a prediction error signal (D$_n$); a reconstructed prediction error signal (D'n); a preliminary reconstructed image (I'$_m$); a final reconstructed image (R'$_n$); a transform (T) and inverse transform (T$^{-1}$); a quantization (Q) and inverse quantization (Q$^{-1}$); entropy encoding (E); a reference frame memory (RFM); inter prediction (Pinter); intra prediction (Pintra); mode selection (MS) and filtering (F).

An example of a decoding process is illustrated in FIG. 3b. FIG. 3b illustrates a predicted representation of an image block (P'$_n$); a reconstructed prediction error signal (D'$_n$); a preliminary reconstructed image (I'$_n$); a final reconstructed image (R'$_n$); an inverse transform (T$^{-1}$); an inverse quantization (Q$^{-1}$); an entropy decoding (E$^{-1}$); a reference frame memory (RFM); a prediction (either inter or intra) (P); and filtering (F).

Figure 4A:
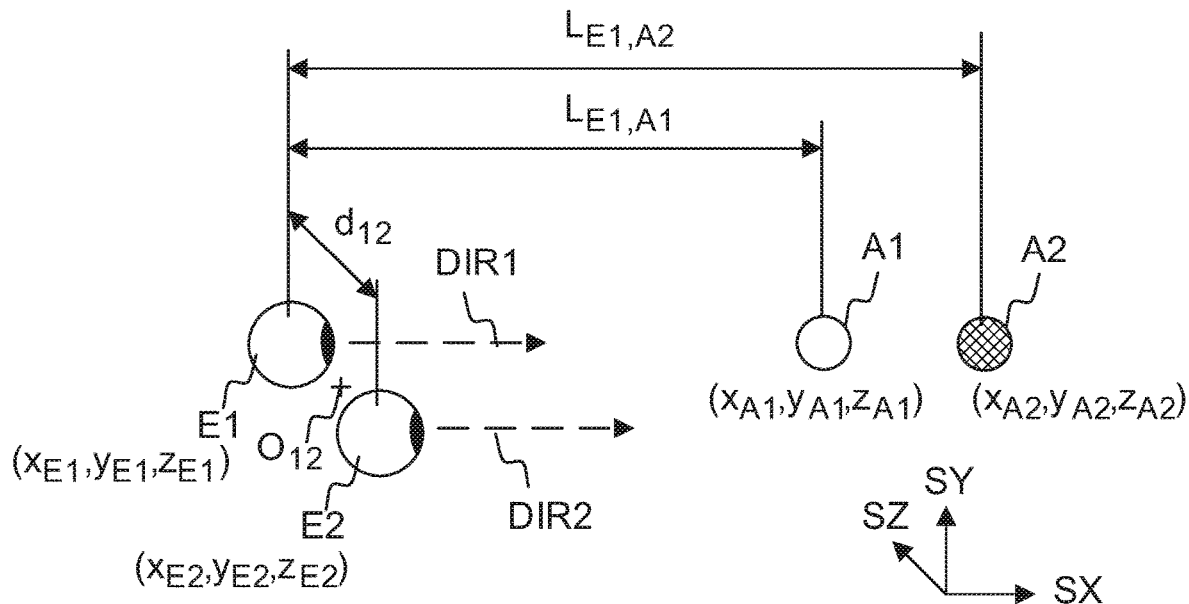
FIGS. 4a, 4b, 4c and 4d show a setup for forming a stereo image of a scene to a user.

FIGS. 4a, 4b, 4c and 4d show a setup for forming a stereo image of a scene to a user, for example a video frame of a 3D video. In FIG. 4a, a situation is shown where a human being is viewing two spheres A1 and A2 using both eyes E1 and E2. The sphere A1 is closer to the viewer than the sphere A2, the respective distances to the first eye El being L$_{E1,A1}$ and LEl,A2 The different objects reside in space at their respective (x,y,z) coordinates, defined by the coordinate system SX, SY and SZ. The distance d12 between the eyes of a human being may be approximately 62-64 mm on average, and varying from person to person between 55 and 74 mm. This distance is referred to as the parallax, on which stereoscopic view of the human vision is based on. The viewing directions (optical axes) DIR1 and DIR2 are typically essentially parallel, possibly having a small deviation from being parallel, and define the field of view for the eyes. The head of the user has an orientation (head orientation) in relation to the surroundings, most easily defined by the common direction of the eyes when the eyes are looking straight ahead. That is, the head orientation tells the yaw, pitch and roll of the head in respect of a coordinate system of the scene where the user is.

When the viewer's body (thorax) is not moving, the viewer's head orientation is restricted by the normal anatomical ranges of movement of the cervical spine.

In the setup of FIG. 4a, the spheres A1 and A2 are in the field of view of both eyes. The centre-point O$_{12}$ between the eyes and the spheres are on the same line. That is, from the centre-point, the sphere A2 is behind the sphere A1. However, each eye sees part of sphere A2 from behind A1, because the spheres are not on the same line of view from either of the eyes.

Figure 4B:
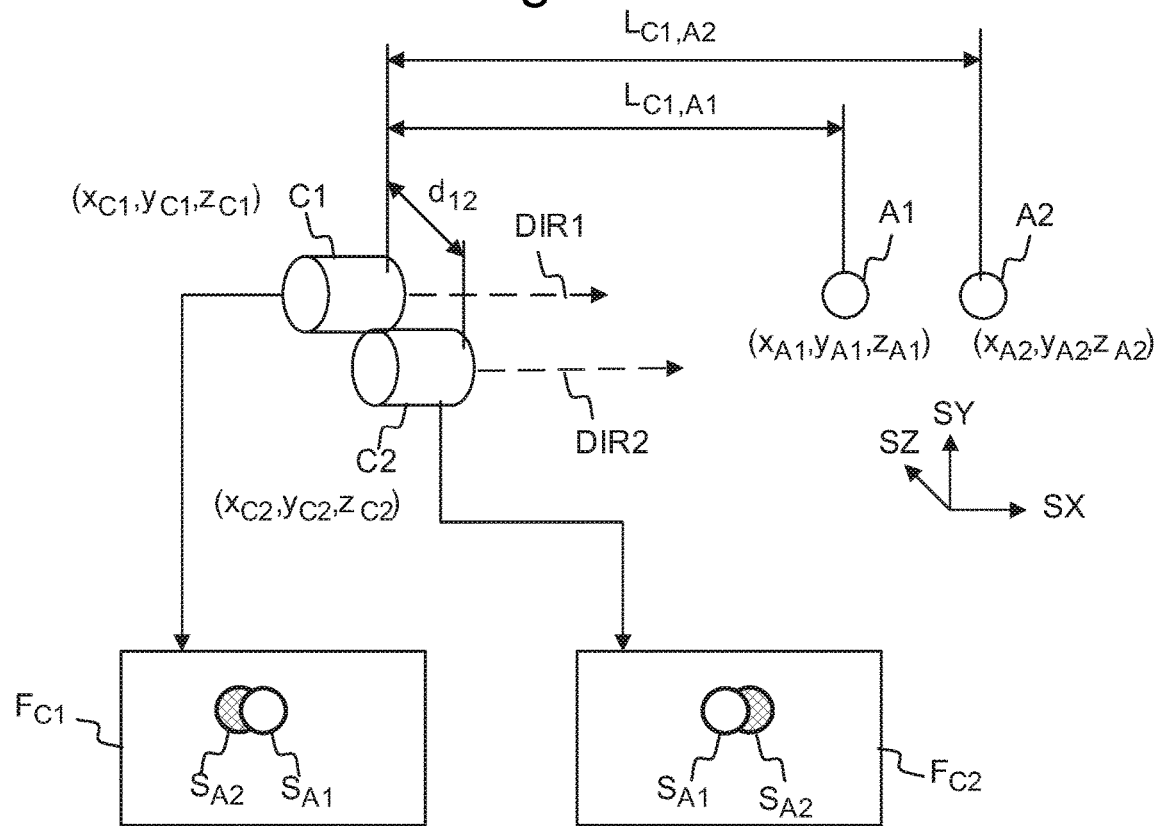

In FIG. 4b, there is a setup shown, where the eyes have been replaced by cameras C1 and C2, positioned at the location where the eyes were in FIG. 4a. The distances (e.g. L$_{C1,A1}$ and L$_{C1,A2}$) and directions of the setup are otherwise the same. Naturally, the purpose of the setup of FIG. 4b is to be able to take a stereo image of the spheres A1 and A2. The two images resulting from image capture are F$_{C1}$ and F$_{C2}$. The "left eye" image F$_{C1}$ shows the image S$_{A2}$ of the sphere A2 partly visible on the left side of the image SAl of the sphere A1. The "right eye" image F$_c$2 shows the image Sd of the sphere A2 partly visible on the right side of the image S$_{A1}$ of the sphere A1. This difference between the right and left images is called disparity, and this disparity, being the basic mechanism with which the HVS determines depth information and creates a 3D view of the scene, can be used to create an illusion of a 3D image.

In this setup of FIG. 4b, where the inter-eye distances correspond to those of the eyes in FIG. 4a, the camera pair C1 and C2 has a natural parallax, that is, it has the property of creating natural disparity in the two images of the cameras. Natural disparity may be understood to be created even though the distance between the two cameras forming the stereo camera pair is somewhat smaller or larger than the normal distance (parallax) between the human eyes, e.g. essentially between 40 mm and 100 mm or even 30 mm and 120 mm.

It needs to be understood here that the images F$_{C1}$ and F$_{C2}$ may be captured by cameras C1 and C2, where the cameras C1 and C2 may be real-world cameras or they may be virtual cameras. In the case of virtual cameras, the images F$_{C1}$ and F$_{C2}$ may be computed from a computer model of a scene by setting the direction, orientation and viewport of the cameras C1 and C2 appropriately such that a stereo image pair suitable for viewing by the human visual system (HVS) is created.

Figure 4C:
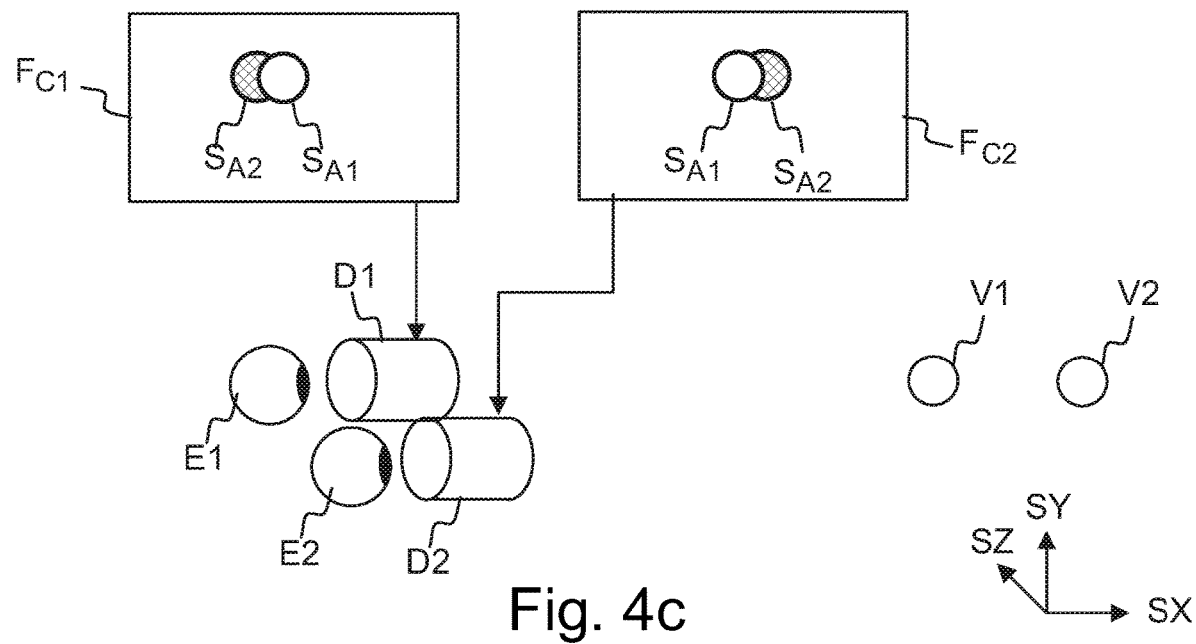

In FIG. 4c, the creating of this 3D illusion is shown. The images F$_{C1}$ and F$_{C2}$ captured or computed by the cameras C1 and C2 are displayed to the eyes E1 and E2, using displays D1 and D2, respectively. The disparity between the images is processed by the human visual system so that an understanding of depth is created. That is, when the left eye sees the image S$_{A2}$ of the sphere A2 on the left side of the image S$_{A1}$ of sphere A1, and respectively the right eye sees the image S$_{A2}$ of the sphere A2 on the right side, the human visual system creates an understanding that there is a sphere V2 behind the sphere V1 in a three-dimensional world. Here, it needs to be understood that the images F$_{C1}$ and F$_{C2}$ can also be synthetic, that is, created by a computer. If they carry the disparity information, synthetic images will also be seen as three-dimensional by the human visual system. That is, a pair of computer-generated images can be formed so that they can be used as a stereo image.

Figure 4D:
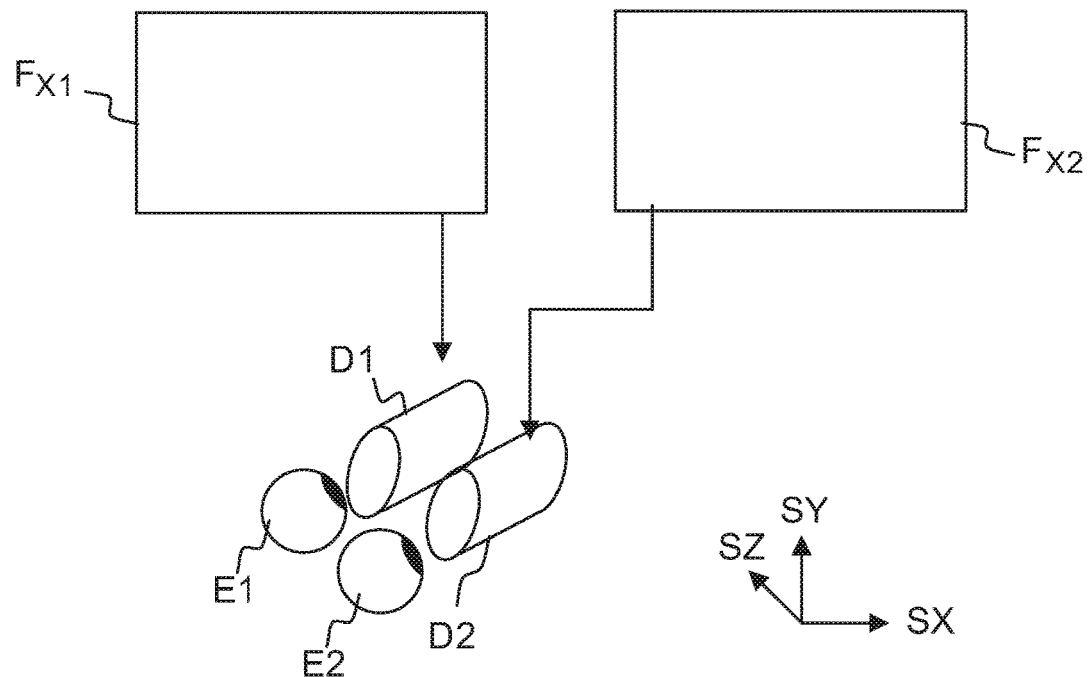

FIG. 4d illustrates how the principle of displaying stereo images to the eyes can be used to create 3D movies or virtual reality scenes having an illusion of being three-dimensional. The images F$_{X1}$ and F$_{X2}$ are either captured with a stereo camera or computed from a model so that the images have the appropriate disparity. By displaying a large number (e.g. 30) frames per second to both eyes using display D1 and D2 so that the images between the left and the right eye have disparity, the human visual system will create a cognition of a moving, three-dimensional image.

The field of view represented by the content may be greater than the displayed field of view e.g. in an arrangement depicted in FIG. 4d. Consequently, only a part of the content along the direction of view (a.k.a. viewing orientation) is displayed at a single time. This direction of view, that is, the head orientation, may be determined as a real orientation of the head e.g. by an orientation detector mounted on the head, or as a virtual orientation determined by a control device such as a joystick or mouse that can be used to manipulate the direction of view without the user actually moving his head. That is, the term "head orientation" may be used to refer to the actual, physical orientation of the user's head and changes in the same, or it may be used to refer to the virtual direction of the user's view that is determined by a computer program or a computer input device.

The content may enable viewing from several viewing positions within the 3D space. The texture picture(s), the geometry picture(s) and the geometry information may be used to synthesize the images F$_{X1}$ and/or F$_{X2}$ as if the displayed content was captured by camera(s) located at the viewing position.

The principle illustrated in FIGS. 4a-4d may be used to create three-dimensional images to a viewer from a three-dimensional scene model (volumetric video) after the scene model has been encoded at the sender and decoded and reconstructed at the receiver. Because volumetric video describes a 3D scene or object at different (successive) time instances, such data can be viewed from any viewpoint. Therefore, volumetric video is an important format for any augmented reality, virtual reality and mixed reality applications, especially for providing viewing capabilities having six degrees of freedom (so-called 6DOF viewing).

Figure 5A:
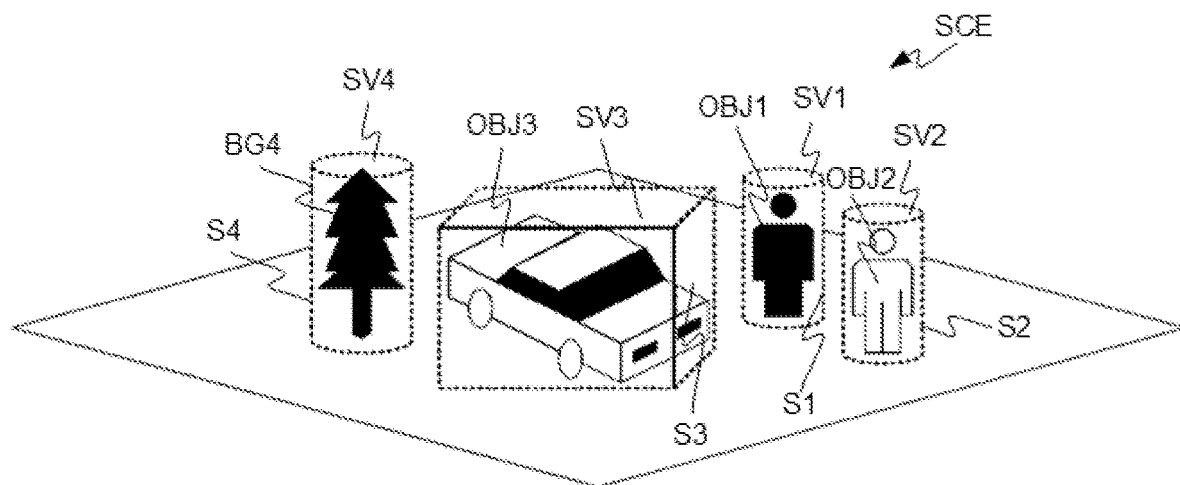
FIGS. 5a and 5b illustrate projection of source volumes in a scene and parts of an object to projection surfaces, as well as determining depth information.
Figure 5B:
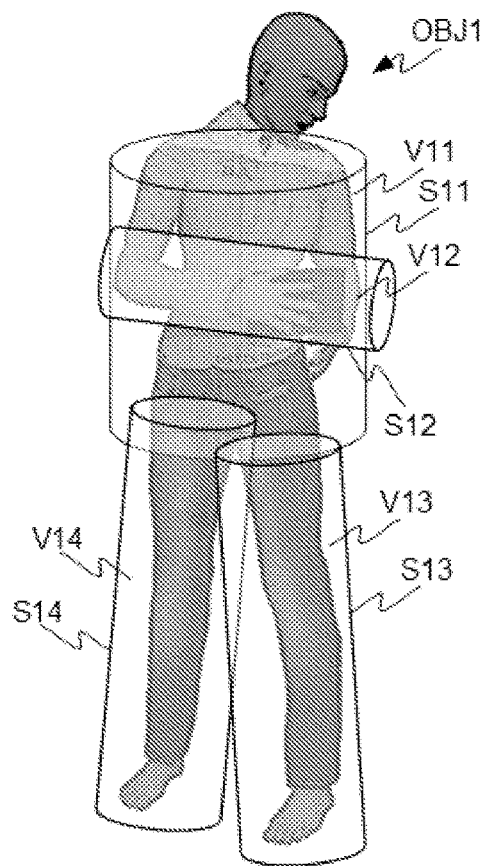

FIGS. 5a and 5b illustrate projection of source volumes in a digital scene model SCE and parts of an object model OBJ1, OBJ2, OBJ3, BG4 to projection surfaces S1, S2, S3, S4, S11-S14, as well as determining depth information for the purpose of encoding volumetric video.

The projection of source volumes SV1, SV2, SV3, SV4, V11-V14 may result in texture pictures and geometry pictures, and there may be geometry information related to the projection source volumes and/or projection surfaces. Texture pictures, geometry pictures and projection geometry information may be encoded into a bitstream. A texture picture may comprise information on the colour data of the source of the projection. Through the projection, such colour data may result in pixel colour information in the texture picture. Pixels may be coded in groups, e.g. coding units of rectangular shape. The projection geometry information may comprise but is not limited to one or more of the following:
- projection type, such as planar projection or equirectangular projection
- projection surface type, such as a cube
- location of the projection surface in 3D space
- orientation of the projection surface in 3D space
- size of the projection surface in 3D space
- type of a projection centre, such as a projection centre point, axis, or plane
- location and/or orientation of a projection centre.

The projection may take place by projecting the geometry primitives (points of a point could, triangles of a triangle mesh or voxels of a voxel array) of a source volume SV1, SV2, SV3, SV4, V11-V14 (or an object OBJ1, OBJ2, OBJ3, BG4) onto a projection surface S1, S2, S3, S4, S11-S14. The geometry primitives may comprise information on the texture, for example a colour value or values of a point, a triangle or a voxel. The projection surface may surround the source volume at least partially such that projection of the geometry primitives happens from the centre of the projection surface outwards to the surface. For example, a cylindrical surface has a centre axis and a spherical surface has a centre point. A cubical or rectangular surface may have centre planes or a centre axis and the projection of the geometry primitives may take place either orthogonally to the sides of the surface or from the centre axis outwards to the surface. The projection surfaces, e.g. cylindrical and rectangular, may be open from the top and the bottom such that when the surface is cut and rolled out on a two-dimensional plane, it forms a rectangular shape. Such rectangular shape with pixel data can be encoded and decoded with a video codec.

Alternatively or in addition, the projection surface such as a planar surface or a sphere may be inside a group of geometry primitives, e.g. inside a point cloud that defines a surface. In the case of an inside projection surface, the projection may take place from outside in towards the centre and may result in sub-sampling of the texture data of the source.

In a point cloud based scene model or object model, points may be represented with any floating point coordinates. A quantized point cloud may be used to reduce the amount of data, whereby the coordinate values of the point cloud are represented e.g. with 10-bit, 12-bit or 16-bit integers. Integers may be used because hardware accelerators may be able to operate on integers more efficiently. The points in the point cloud may have associated colour, reflectance, opacity etc. texture values. The points in the point cloud may also have a size, or a size may be the same for all points. The size of the points may be understood as indicating how large an object the point appears to be in the model in the projection. The point cloud is projected by ray casting from the projection surface to find out the pixel values of the projection surface. In such a manner, the topmost point remains visible in the projection, while points closer to the centre of the projection surface may be occluded. In other words, in general, the original point cloud, meshes, voxels, or any other model is projected outwards to a simple geometrical shape, this simple geometrical shape being the projection surface.

Different projection surfaces may have different characteristics in terms of projection and reconstruction. In the sense of computational complexity, a projection to a cubical surface may be the most efficient, and a cylindrical projection surface may provide accurate results efficiently. Also cones, polyhedron-based parallelepipeds (hexagonal or octagonal, for example) and spheres or a simple plane may be used as projection surfaces.

The phrase along the bitstream (e.g. indicating along the bitstream) may be defined to refer to out-of-band transmission, signalling, or storage in a manner that the out-of-band data is associated with the bitstream. The phrase decoding along the bitstream or alike may refer to decoding the referred out-of-band data (which may be obtained from out-of-band transmission, signalling, or storage) that is associated with the bitstream. For example, an indication along the bitstream may refer to metadata in a container file that encapsulates the bitstream.

Texture pictures may be encoded into a bitstream, and the texture pictures may comprise projection of texture data of source volumes SV1, SV2, SV3, SV4, V11, V12, V13, V14 of objects OBJ1, OBJ2, OBJ3, BG4 of a scene model SCE onto projection surfaces S1, S2, S3, S4, S11-S14.

In the projection, data on the position of the originating geometry primitive may also be determined, and based on this determination, a geometry picture may be formed. This may happen for example so that depth data is determined for each or some of the texture pixels of the texture picture. Depth data is formed such that the distance from the originating geometry primitive such as a point to the projection surface is determined for the pixels. Such depth data may be represented as a depth picture, and similarly to the texture picture, such geometry picture (in this example, depth picture) may be encoded and decoded with a video codec. These geometry pictures may be seen to represent a mapping of the projection surfaces to the source volumes, and the decoder may use this information to determine the location of geometry primitives in the model to be reconstructed. In order to determine the position of the source volumes and/or the projection surfaces and/or the projections in the scene model, there may be geometry information encoded into or along the bitstream.

A picture may be defined to be either a frame or a field. A frame may be defined to comprise a matrix of luma samples and possibly the corresponding chroma samples. A field may be defined to be a set of alternate sample rows of a frame. Fields may be used as encoder input for example when the source signal is interlaced. Chroma sample arrays may be absent (and hence monochrome sampling may be in use) or may be subsampled when compared to luma sample arrays. Some chroma formats may be summarized as follows:

In monochrome sampling there is only one sample array, which may be nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling when no separate colour planes are in use, each of the two chroma arrays has the same height and width as the luma array.

It is possible to code sample arrays as separate colour planes into the bitstream and respectively decode separately coded colour planes from the bitstream. When separate colour planes are in use, each one of them is separately processed (by the encoder and/or the decoder) as a picture with monochrome sampling.

Texture picture(s) and the respective geometry picture(s) may have the same or different chroma format.

Depending on the context, a pixel may be defined to a be a sample of one of the sample arrays of the picture or may be defined to comprise the collocated samples of all the sample arrays of the picture.

Multiple source volumes (objects) may be encoded as texture pictures, geometry pictures and projection geometry information into the bitstream in a similar manner. That is, as in FIG. 5a, the scene model SCE may comprise multiple objects OBJ1, OBJ2, OBJ3, BG4, and these may be treated as source volumes SV1, SV2, SV3, SV4 and each object may be coded as a texture picture, geometry picture and projection geometry information.

As shown in FIG. 5b, a single object may be composed of different parts and thus different source volumes V11, V12, V13, V14 and corresponding projection surfaces S11, S12, S13, S14 may be used for these different parts.

In the above, the texture pictures of the source volumes and further texture pictures of possible other source volumes may represent the same time instance. That is, there may be a plurality of texture and geometry pictures and projection geometry information for one time instance, and the other time instances may be coded in a similar manner. Since the various source volumes are in this way producing sequences of texture pictures and sequences of geometry pictures, as well as sequences of projection geometry information, the inter-picture redundancy in the picture sequences can be used to encode the texture and geometry data for the source volumes efficiently, compared to the presently known ways of encoding volume data.

There may be one or more coordinate systems in the scene model. The scene model may have a coordinate system and one or more of the objects (source volumes) in the scene model may have their local coordinate systems. The shape, size, location and orientation of one or more projection surfaces may be encoded into or along the bitstream with respect to the scene model coordinates. Alternatively or in addition, the encoding may be done with respect to coordinates of the scene model or said first source volume. The choice of coordinate systems may improve the coding efficiency.

Information on temporal changes in location, orientation and size of one or more said projection surfaces may be encoded into or along the bitstream. For example, if one or more of the objects (source volumes) being encoded is moving or rotating with respect to the scene model, the projection surface moves or rotates with the object to preserve the projection as similar as possible.

If the projection volumes are changing, for example splitting or bending into two parts, the projection surfaces may be sub-divided respectively. Therefore, information on sub-division of one or more of the source volumes and respective changes in one or more of the projection surfaces may be encoded into or along the bitstream.

The resulting bitstream may then be output to be stored or transmitted for later decoding and reconstruction of the scene model.

A standard 2D video encoder may then receive the planes as inputs, either as individual layers per object, or as a frame-packed representation of all objects. The texture picture may thus comprise a plurality of projections of texture data from further source volumes and the geometry picture may represent a plurality of mappings of projection surfaces to the source volume.

For each object, additional information may be signalled to allow for reconstruction at the decoder side:

in the case of a frame-packed representation: separation boundaries may be signalled to recreate the individual planes for each object, in the case of projection-based compression of static content: classification of each object as static/dynamic may be signalled, relevant data to create real-world geometry data from the decoded (quantised) geometry channel(s), e.g. quantisation method, depth ranges, bit depth, etc. may be signalled, initial state of each object: geometry shape, location, orientation, size may be signalled, temporal changes for each object, either as changes to the initial state on a per-picture level, or as a function of time may be signalled, and nature of any additional auxiliary data may be signalled.

For the described example above, signalling may, for example, be as follows:

```
NUM OBJECTS        4        // folding-chair, TV, person body, person head
FRAME_PACKED       0        // individual inputs
for i=0:NUM_OBJECTS         // initial states for each projection
PROJ_GEO                    // geometry, e.g. 0: cube, 1: cylinder, 2: sphere, . . .
PROJ_CENTRE_X/Y/Z           // projection centre in real world coordinates
PROJ_SIZE_ X/Y/Z            // projection dimensions in real world units
PROJ_ROTATION_X/Y/Z         // projection orientation
PROJ_STATUS                 // 0: dynamic 1:static
DEPTH_QUANT                 // depth quantisation, i.e. 0 for linear, . . .
DEPTH_MIN                   // minimum depth in real world units
DEPTH_MAX                   // maximum depth in real world units
```

```
end
for n=0:NUM_FRAMES
    for i=0:NUM_OBJECTS
        CHANGE   1          // i.e. 0=static, 1=translation, 2=trans+rotation, ...
        TRANS_VEC           // translation vector
        ...                 // relevant data to represent change
    end
end
```

The decoder may receive the static 3D scene model data together with the video bitstreams representing the dynamic parts of the scene model. Based on the signalled information on the projection geometries, each object may be reconstructed in 3D space and the decoded scene model is created by fusing all reconstructed parts (objects or source volumes) together.

Standard video encoding hardware may be utilized for real-time compression/decompression of the projection surfaces that have been unfolded onto planes.

Simple objects might suffice to be projected and coded with a single projection. Complex objects or larger scene models may require several (different) projections. The projection geometry may remain constant over a volumetric video sequence, but the location and orientation of the projection surfaces in space can change (and can be possibly predicted in the encoding, wherein the difference from the prediction is encoded).

Projecting 3D data onto 2D planes is independent from the 3D scene model representation format. There exist several approaches for projecting 3D data onto 2D planes, with the respective signalling. For example, there exist several mappings from spherical coordinates to planar coordinates, known from map projections of the globe, and the type and parameters of such projection may be signalled. For cylindrical projections, the aspect ratio of height and width may be signalled.

Figure 6A:
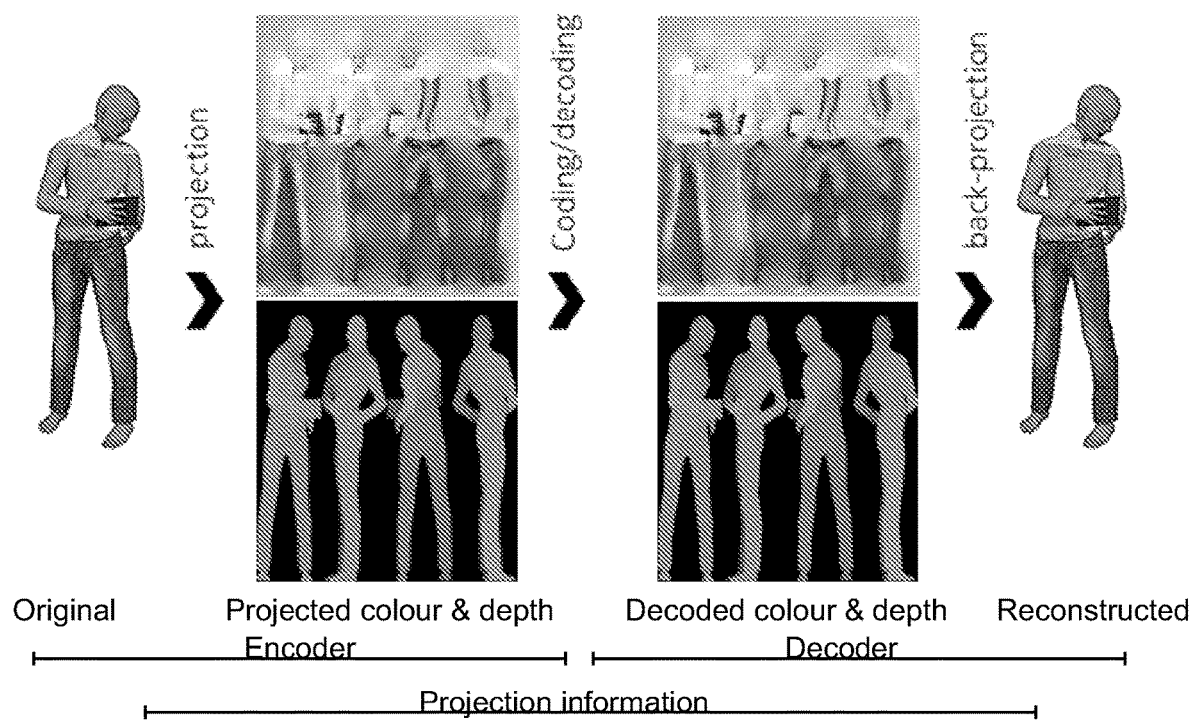
FIG. 6a illustrates a projection onto four sides of a cube and the respective reconstruction.
Figure 6B:
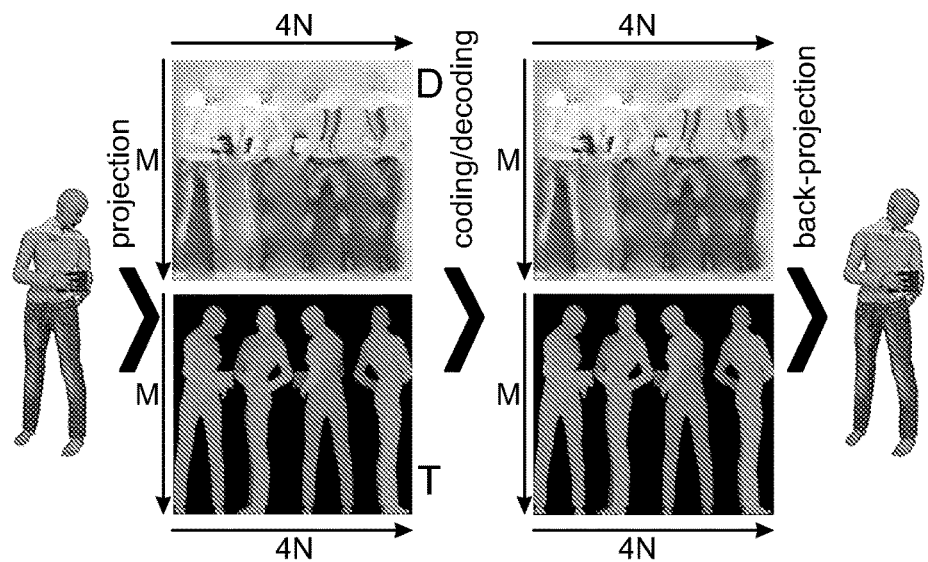
FIGS. 6b illustrates an example of projecting and reconstructing a volumetric video object onto two M×4N planes having a texture plane and a depth plane.

A 3D object, represented as meshes, points, and/or voxels, is projected onto one or more geometries. These geometries are unfolded onto two 2D planes per geometry: one plane for texture and one plane for depth. FIG. 6b illustrates such a projection onto four sides of a cube and the respective reconstruction, whereas the projection planes T for texture and D for depth/geometry have a resolution of M×4N pixel (1 N for each side=4 N). Relevant projection geometry information may be transmitted alongside the encoded video files to the decoder. The decoder may then decode the video and perform the inverse projection to regenerate the 3D scene model object in any desired representation format, which may be different from the starting format e.g. reconstructing a point cloud from original mesh model data.

For the illustrated planar projection in FIG. 6b, a point p(x,y,z) in 3D space P(X,Y,Z) would be represented by its texture information (e.g. RGB values) with $T(x,y)=[R_p, G_p, B_p]$ and its geometry information with $D(x,y)=z$. Typically the resolutions of the projection planes are lower than the bounding box of the volumetric data, i.e. M<Y and N<X, thus subsampling occurs as neighbouring points in 3D space are mapped onto the same coordinates in the texture plane T and the depth/geometry plane D. Usually Z-buffering is then applied to ensure only the most outward facing point in 3D space is mapped onto the 2D plane to avoid incorrect surfaces, i.e. only keep the point with the closest distance to the projection geometry surface.

However, z-buffering ignores the surface characteristics of the volumetric video data source, allowing irregular projections and thus leading to reconstruction artifacts. A possible solution would be to increase the spatial resolution of the projection planes to match P, as in M>=Y, N>=X, but this might increase the required bit rate drastically and may not be feasible for large and/or high detail, i.e. floating point precision, volumetric video.

In the following, a surface-regulated approach is described in more detail by which the representation of volumetric video surfaces in the sub-sampled projection plane (encoder side) may be improved. In accordance with an embodiment, the approach comprises the following operations. A 3D object is obtained and projected onto one or more geometries i.e. projection planes such as a texture plane and a depth plane. The points (positions) on the texture plane are examined to find out which points (positions) T(x,y) in the 3D object have been projected to the same 2D point (position) in the texture plane. Then, for these points the corresponding 3D-coordinates are examined to find out the location of these points in the 3D object. For simplicity of the explanation, these points can be regarded as a set of candidate points or a set of three-dimensional candidate points in this specification. A candidate point can then be selected from the set of candidate points. The selected candidate point is compared with one or more other candidate points in the set which are closest to the selected candidate point. The purpose of the comparison is to find out whether the candidate point and the other point(s) are located within a same, smooth surface or if there is a large "slope" between the points. This may be determined e.g. by examining gradients of the points. If a gradient between the candidate point and another point under examination has a value smaller than a threshold, it can be determined that they are located at a smooth surface. This procedure may be repeated to all the points in the set of candidate points to find out points on a same smooth surface and points which may be outliers from the same surface. Those points which were determined to belong to the same surface may be called as a set of surface points in this specification.

It may happen that the first selected candidate point is such that it itself is an outlier or is within another smooth surface. This may be revealed by repeating the above procedure by selecting another point as the candidate point.

When points within the same surface have been determined, a geometric centre of mass is determined for the surface by using the 3D coordinates of the points in the surface. The depth value of the geometric centre of mass is mapped to the depth plane D(x,y).

There can be more than one surface detected in the set of candidate points. One or more additional surfaces may be identified by iterating the outlier identification process on the set of outliers. In such a case the depth value of the geometric centre of mass calculated from the centres of mass of all surfaces is mapped to the depth plane D(x,y). A condition for stopping the iteration may be, for example, a number of remaining outliers, a number of already identified surfaces, etc.

Figure 6C:
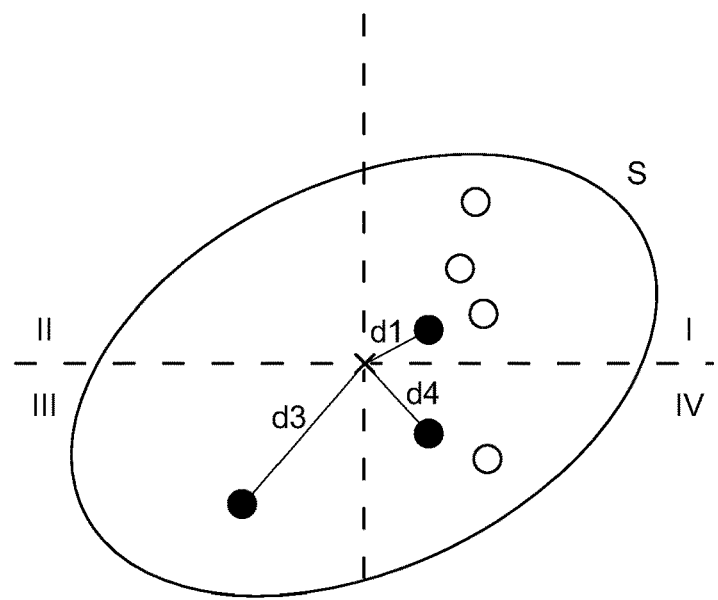
FIG. 6c shows an illustration of texture interpolation for surface-regulated downsampling.

The colour value of the centre of mass is then determined e.g. as follows. The surface S is divided into four quadrants I, II, III, IV so that the geometric centre of mass is at the origin of the four quadrants, as is illustrated in FIG. 6c. For each quadrant, distance of points within the quadrant to the geometric centre of mass is determined and colour information of only that point, which is closest to the geometric centre of mass in the quadrant is used. When this determination has been made to each of the four quadrants, the colour value of all the closest points are combined to be used as the colour of that surface. In other words, the colour value is used on the basis of one, two, three or four points although the surface may contain more than four points. In the example of FIG. 6c the black circles having distances indicated with labels dl, d3, d4 are the closest points in the quadrants.

The colour value of the geometric centre of mass may be obtained, for example, by interpolating the colour values of the nearest neighbours (only one per direction) and mapped to T(x,y). It may also be possible to utilize weighting e.g. so that the colour value of a point is weighted by the distance d1, d3, d4 of the point from the geometric centre of mass. In other words, the shorter the distance the greater the weight of that point in the determination of the colour value.

The selection of the quadrants may have different alternatives. As an example, the point of the set of points on the surface S which is closest to the geometric centre of mass may be selected to belong to a first quadrant I and the border between the first quadrant I and the fourth quadrant IV may be directed to point to the closest point. According to another example, the quadrants may be defined so that the points are as evenly distributed within each quadrant as possible.

It should be noted that instead of the four quadrants, the surface S may also be divided in a different way to two or more sections.

In the above described method the determination which points in the 3D object have been projected to the same 2D point (position) in the texture plane may be performed by utilising a forward-projection approach or a backward-projection approach. In accordance with an embodiment, in the forward-projection approach some kind of bookkeeping procedure may be utilised so that when a 3D point is projected to a location in the 2D plane, an index for that location is increased and possibly the coordinate information of the 3D point is also stored. Hence, the indices reveal the number of points projected to each location and the coordinate information reveals the original location of those points in the 3D object. These points may be called as a set of candidate points. In accordance with an embodiment, in the backward-projection approach a point in the 2D plane is projected to the 3D plane and the coordinates of the back-projected point are determined. These coordinates may then be used to determine whether a point belongs to the surface or not.

In accordance with an embodiment, in the backward-projection only one, preferably the outmost point projected onto a 2D coordinate (z-buffering) is taken into account and possible other points are not. This point is then reprojected into the 3D space. Then, all points which are within a given radius of this reprojection are selected to the set of candidates.

During the reconstruction (e.g. at a decoder side) this process is mirrored using the same piece-wise smooth surface assumption, e.g. $D(x,y) \cong D(x+1,y)$ for horizontal upsampling, to interpolate 3D points for a high-quality volumetric video reconstruction.

In an embodiment, an encoded volumetric video is received in which an object in the three-dimensional space P(X,Y,Z) is represented by at least one texture plane T and at least one depth plane D. Also the upsampling factor may be received, which need not be the same than a downsampling factor used in the encoding phase. The desired reconstruction in the three-dimensional space has three-dimensional dimensions [0 . . . X, 0 . . . Y, 0 . . . Z]. The at least one texture plane T and at least one depth plane D are decoded from the encoded volumetric video to projection planes, i.e. the texture plane T and depth plane D. The decoded texture plane T and depth plane D have 2D dimensions [0 . . . M, 0 . . . N] so that the 2D dimensions M, N are smaller than the 3D dimensions Y, X, respectively (i.e. M<Y and N<X). Points in the decoded texture plane T at locations (m,n) are projected to points in the three-dimensional space P to locations [x,y,z]. The 3D location [x,y,z] of a point p in the three-dimensional space P is derived from the depth plane D (D(n,m)=z) and multiplying the coordinates of the point in the texture plane by an upsampling factor f: x=f*m and y=f*n. The colour value of the point p can be obtained from the texture plane at the location n,m: T(n,m)=[colour values]. Those pixels which will not be directly obtained by the 2D to 3D projection, may be obtained by interpolation. In the interpolation it is examined whether neighbouring points in the texture plane and/or the depth plane, i.e. T/D(n,m) and T/D(n+1,m) in the horizontal direction, and T/D(n,m) and T/D(n,m+1) in the vertical direction, belong to the same surface, i.e. the depth values of those neighbouring points are the same or almost the same: $D(n,m) \cong D(n+1,m)$ or $D(n,m) \cong D(n,m+1)$, as will be explained later in this specification.

In accordance with an embodiment, the horizontal upsampling may be performed as follows. The 3D reconstruction of point $p_1$ is defined by T/D(x,y), its neighbouring point $p_2$ is defined by T/D(x+1,y). It is checked if the pixels are part of the same piece-wise smooth surface, which means that the depth values of the point $p_1$ and the neighbouring point $p_2$ are the same or almost the same, i.e. $D(x,y) \cong D(x+1,y)$. If so, w number of points between the 3D reconstructions $P_1$ and $P_2$ are interpolated, where w is a predefined upsampling factor, which does not have to be the same as the downsampling factor at the decoder side. However, if the pixels are not part of the same piece-wise smooth surface, it can be deduced that an object or surface boundary has been detected. Hence, any interpolation will not be performed.

The above described approach may improve reconstruction quality compared to typical z-buffer downsampling and can be utilized to decrease the projection plane spatial resolutions further without any significantly affecting reconstruction quality, thus increasing coding efficiency. Furthermore, coding and decoding complexity is decreased as there are less pixels to code/decode.

This approach can be adapted for mixed-resolution projection planes, allowing for content-adaptive projection-based volumetric video compression, i.e. different downsampling and upsampling factors between texture and depth planes: Typically, depth information is smoother than texture information. Thus, coding efficiency can be improved by downsampling depth planes by a larger factor while preserving high texture detailing with a smaller downsampling factor for texture planes. In a similar way, high geometry detailing could be preserved for smooth texture 3D objects.

In the following, some examples of implementations of the above approach will now be described in more detail. First, a surface-regulated downsampling for projection-based volumetric video compression will be explained.

In an embodiment, a volumetric video object in 3D space P(X,Y,Z) is represented by at least one texture plane T and at least one depth plane D. The desired reconstruction 3D space has 3D dimensions [0 . . . X, 0 . . . Y, 0 . . . Z] and decoded projection planes, i.e. the texture plane T and depth plane D, have 2D dimensions [0 . . . M, 0 . . . N], whereas M<Y and N<X. A 3D point p in the three-dimensional space P at position [x,y,z] would be represented by a pixel T(n, m)=[colour values] and D(n,m)=z, where n=(x/X)*N and m=(y/Y)*M. For each pixel coordinate in the texture plane T and, respectively in the depth place D as they have the same resolution, the corresponding points $p_n$ in P are identified. The identification may be performed either by projecting all points in P onto the texture plane T and summing up the projections onto the same coordinates, or backward-projecting from texture plane T or depth plane D into 3D space and selecting pixels from the backward projected volume.

The above embodiment may have several advantages. Applying the piece-wise smooth assumption of 3D surfaces during the 3D→2D projection step for projection-based volumetric video coding may ensure that the most representative point of a 3D surface is retained in the 2D projection. Thus, the projection planes' spatial resolution can be smaller than the 3D volume resolution without sacrificing as much reconstruction quality as it would be the case for standard z-buffer down sampling. Table I illustrates the gains in coding efficiency for the proposed approaches, following the evaluation methodology set out in the MPEG call for point cloud compression technology comparing against the proposal in Point Cloud Compression V2. ISO/IEC JTC1/SC29/WG11 Doc. N16763, Hobart, AU, April 2017.

neighbouring point $p_2$ is defined by T/D(m+1,n). It is checked if the pixels are part of same piece-wise smooth surface, D(n,m)≅D(n+1,m). If so, w number of points between the 3D reconstructions $p_1$ and $p_2$ are interpolated, where w is a predefined upsampling factor f. The upsampling factor f does not have to be the same as the downsampling factor at the decoder side. However, if the pixels are not part of the same piece-wise smooth surface, object or surface boundary is detected, wherein any interpolation will not be performed.

In accordance with an embodiment, the vertical upsampling (y-direction) may be performed as follows. The 3D reconstruction of point p1 is defined by T/D(m,n) and its neighbouring point $p_2$ is defined by T/D(n,m). It is checked if the pixels are part of same piece-wise smooth surface, D(n,m)≅D(n,m+1). If so, w number of points between the 3D reconstructions $p_1$ and $p_2$ are Interpolated, where w is a predefined upsampling factor. The upsampling factor f does not have to be the same as the downsampling factor at the decoder side. However, if the pixels are not part of the same piece-wise smooth surface, object or surface boundary is detected any interpolation will not be performed.

The above embodiment may have several advantages. Applying the piece-wise smooth assumption also in the upsampling (reconstruction) of projection-based encoded volumetric video allows for identifying object and surface discontinuities during the reconstruction process. Without such surface discontinuity detection, new 3D points would be interpolated between two independent surfaces, thus turning a previously piece-wise smooth volume into an over-smooth representation. Reflecting the piece-wise smooth surface assumption in both, 3D→2D (sender) and 2D→3D (receiver) projection steps closes the processing

TABLE I

| Approach | Geometry distortion | | Colour distortion | | |
| --- | --- | --- | --- | --- | --- |
| | point2point | point2plane | Y PSNR | U PSNR | V PSNR |
| Full resolution planes | −78.2% | −51.6% | −65.7% | −59.1% | −94.9% |
| Z-buffer downsampling | −73.8% | −63.8% | −66.7% | −59.1% | −95.2% |
| A: Surface-regulated downsampling | −80.5% | −51.3% | −70.0% | −67.6% | −95.8% |
| A&B: Surface-regulated down- & upsampling | −80.6% | −59.9% | −70.5% | −85.3% | −95.9% |

In the following, a surface-regulated spatial upsampling for projection-based volumetric video compression is described in more detail. In accordance with an embodiment, an encoded volumetric video object is represented by at least one texture plane T and at least one depth plane D. The desired reconstruction 3D space has the 3D dimensions [0 . . . X, 0 . . . Y, 0 . . . Z], the decoded projection planes have the 2D dimensions [0 . . . M, 0 . . . N], whereas M<Y and N<X. The 3D location [x,y,z] of point p in P at position is derived from pixel D(n,m)=z, its colour value from T(n,m)=[colour values], where x=f*m and y=f*n. An upsampling factor f is signaled in the bit stream (either the same or independent values for x- and y-direction respectively). Based on this upsampling factor, a maximum number of n new points between each reconstructed points p is interpolated following the piece-wise smooth surface assumption.

In accordance with an embodiment, the horizontal upsampling (x-direction) may be performed as follows. The 3D reconstruction of point $p_1$ is defined by T/D(n,m) and its loop and provides optimised coding efficiency for volumetric video compression. The benefits of this approach in terms of coding efficiency are illustrated in the last row of Table I, where especially the point-to-surface distortion performs better than in the previous embodiment only.

In the following, a surface-regulated temporal sampling for projection-based volumetric video compression is described in more detail. In accordance with an embodiment, similar to the second embodiment above, where sampling is applied in the spatial domain, surface-regulated sampling can also be applied for temporal sampling of volumetric video content. In an embodiment, an encoded dynamic volumetric video object is represented by at least one sequence of texture planes T and at least one sequence of depth planes D. Each temporal instance P(t) of the volumetric video object is represented by one frame of each of the respective planes, T(t) and D(t).

A temporal sampling factor f is either signaled in the bit stream, derived from the playback client capabilities or manually set by the user playing back the content. Based on this sampling factor, a maximum number of n new points between each reconstructed points p is interpolated following the piece-wise smooth surface assumption.

In accordance with an embodiment, the temporal sampling may be performed as follows. The 3D reconstruction of point $p_1$ is defined by T/D(x,y,t) and its temporal successive point $p_2$ is defined by T/D(x,y,t+1). It is checked if pixel are part of same piece-wise smooth surface, D(x,y,t)≅D(x,y,t+1). If so, f number of points between the 3D reconstructions $P_1$ and $P_2$ are interpolated, where f is the temporal upsampling factor. However, if the pixels are not part of the same piece-wise smooth surface, object or surface boundary is detected, wherein any interpolation will not be performed.

It should be noted that it would also be possible for the sampling factor f<1, thus apply temporal surface-regulated downsampling. This functionality would be useful for adjusting framerates to the playback device or user preference.

The above embodiment may have several advantages. Applying the piece-wise smooth assumption for temporally sampling projection-based volumetric video content allows for frame-rate adjustments at the receiver's side while keeping reconstruction quality high. Typical applications for such frame rate adjustments would be fast-forward, slow-motion, or time-lapse effects. Also transmitting content at a lower frame rate and temporally interpolating new instances is beneficial in terms of coding efficiency. Finally, volumetric video content captured with a given playback rate, e.g. 25 frames per second, can be easily adapted to the playback capabilities of different devices, e.g. 30 frames refresh rate.

Figure 7A:
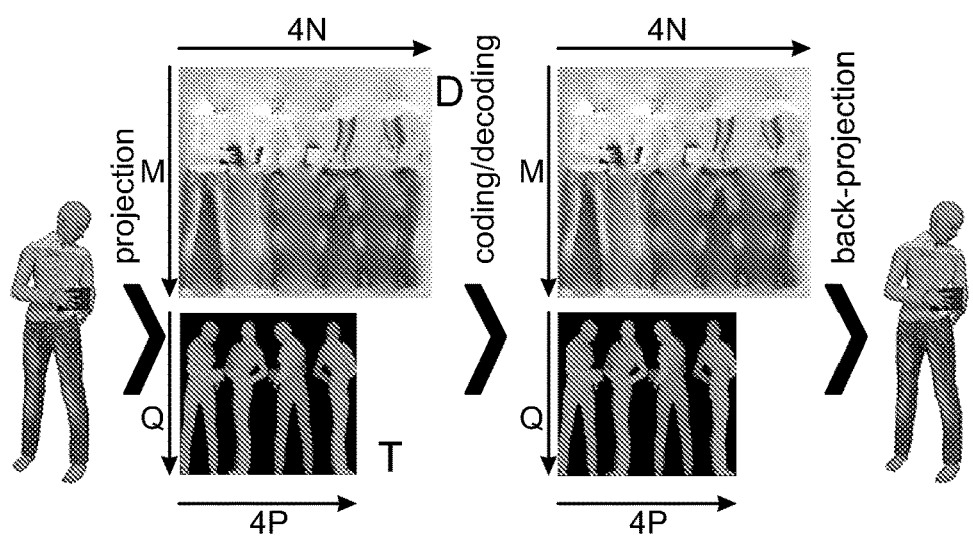
FIG. 7a illustrates a downsampled representation from the height of M pixels and width of N pixels to the height of Q pixels and the width of P pixels.

In the following, a mixed-resolution representation for projection-based volumetric video compression is described in more detail. In accordance with an embodiment, a volumetric video object in 3D space P(X,Y,Z) represented by at least one texture plane T and at least one depth plane D. The 3D space has the 3D dimensions [0 ... X, 0 ... Y, 0 ... Z], the texture plane has the 2D dimensions [0 ... M, 0 ... N], the depth plane has the 2D dimensions [0 ... Q, 0 ... P], whereas M,Q<Y, N,P<X, and M≠Q, N≠P. A 3D point p in P at position [x,y,z] would be represented by pixel T(n,m)= [colour values] and D(p,q)=z, where m=(x/X)*M, n=(y/Y)*N, q=(x/X)*Q, p=(y/Y)*P. FIG. 7a illustrates such a downsampled representation from the height of M pixels and width of N pixels to the height of Q pixels and the width of P pixels, i.e. M>Q and N>P. It should be noted that also the reverse is possible i.e. upsampling from M, N to Q, P so that M<Q and N<P.

Downsampling and upsampling of such mixed-resolution representation is performed analogue to the respective same-resolution representations described in the first and second embodiments presented above. The only difference is that two sampling factors are signalled, one for the texture plane T and one for the depth plane D. The sampling factors are either signalled independently or one derived from the other, e.g. the depth sampling fd is half of the texture sampling ft.

Figure 7B:
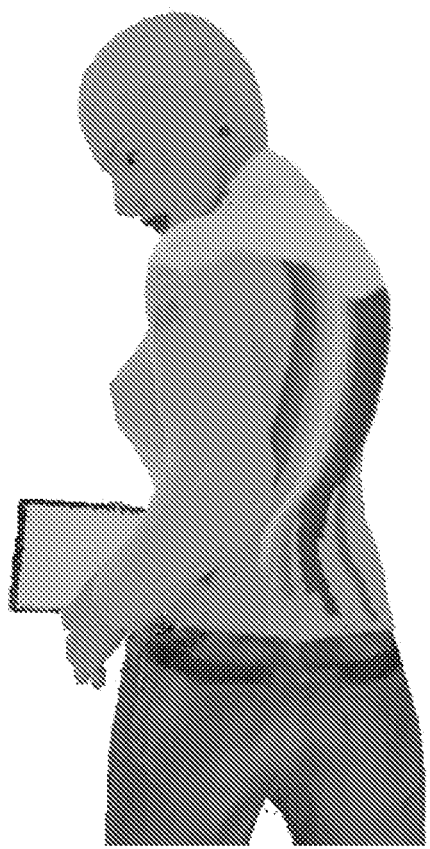
FIG. 7b illustrates an example of a same-resolution approach.
Figure 7C:
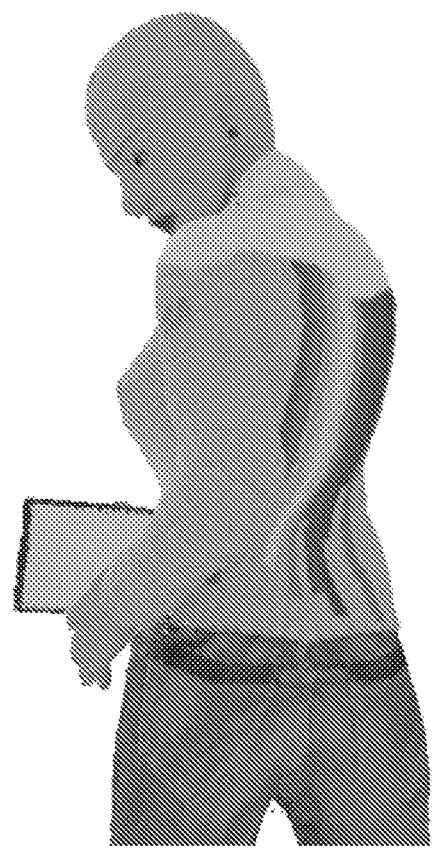
FIG. 7c illustrates a reconstructed volumetric video object for the higher texture plane resolution case compared to the same-resolution approach.

Typically, depth information is smoother than texture information so depth can be downsampled stronger than texture, thus improving coding efficiency without affecting reconstruction quality too much. Alternatively, reconstruction quality can be improved by increasing the resolution for one of the representation planes. FIG. 7c illustrates a reconstructed volumetric video object for the higher texture quality case compared to a same-resolution approach an example of which is depicted in FIG. 7b.

The above embodiment may have several advantages. Mixed-resolution representations for projection-based volumetric video compression provides increased coding efficiency by allowing for stronger sub sampling of more smoother content (typically depth). Additionally, it allows for content-adaptive encoding capabilities, i.e. preserve high geometry detail for complex/detailed volumetric video and/or preserve high texture detail for strongly textured volumetric video.

Figure 8A:
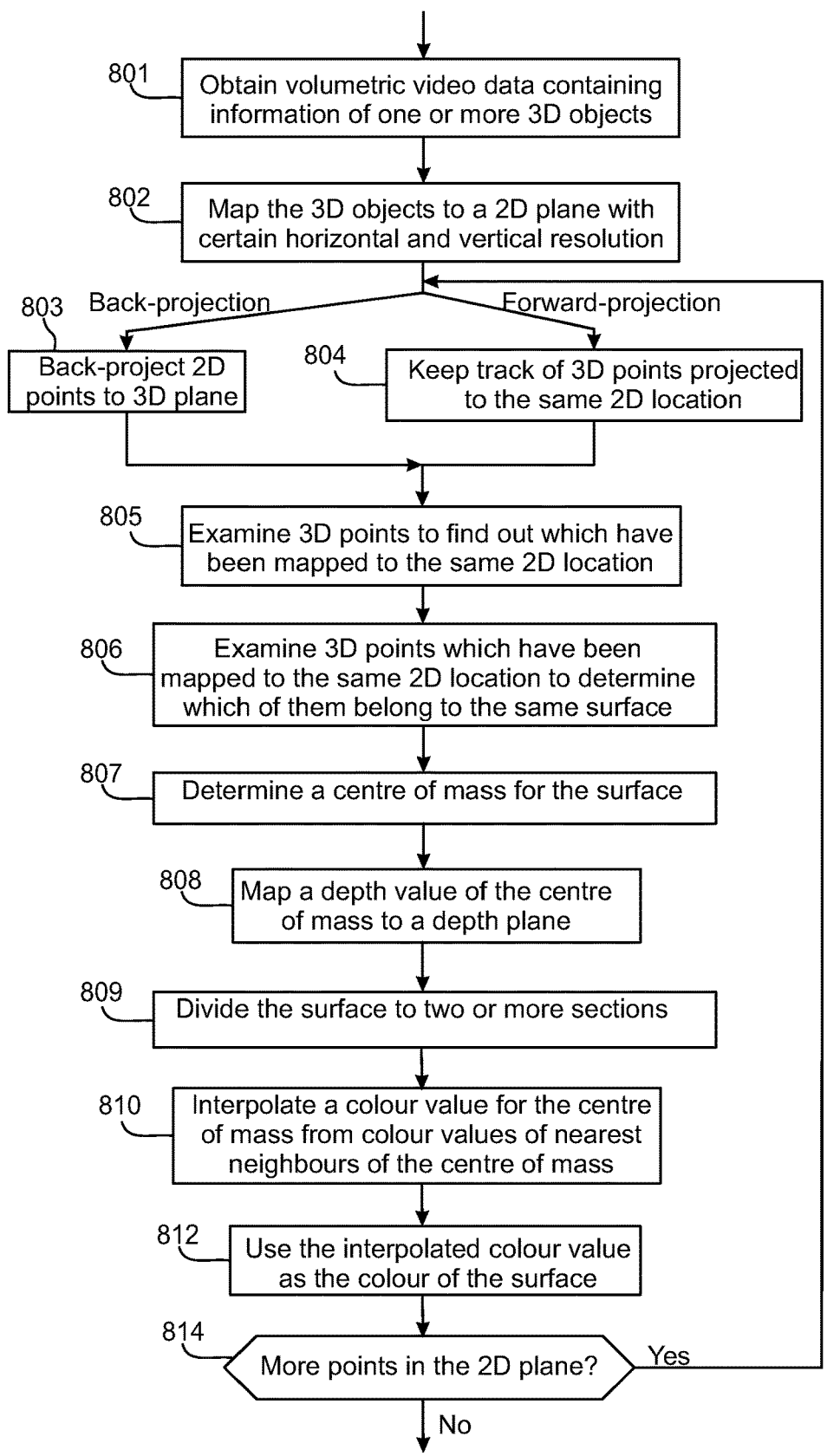
FIGS. 8a and 8b show flow charts for compressing encoding and decoding of a scene of a volumetric video.
Figure 8B:
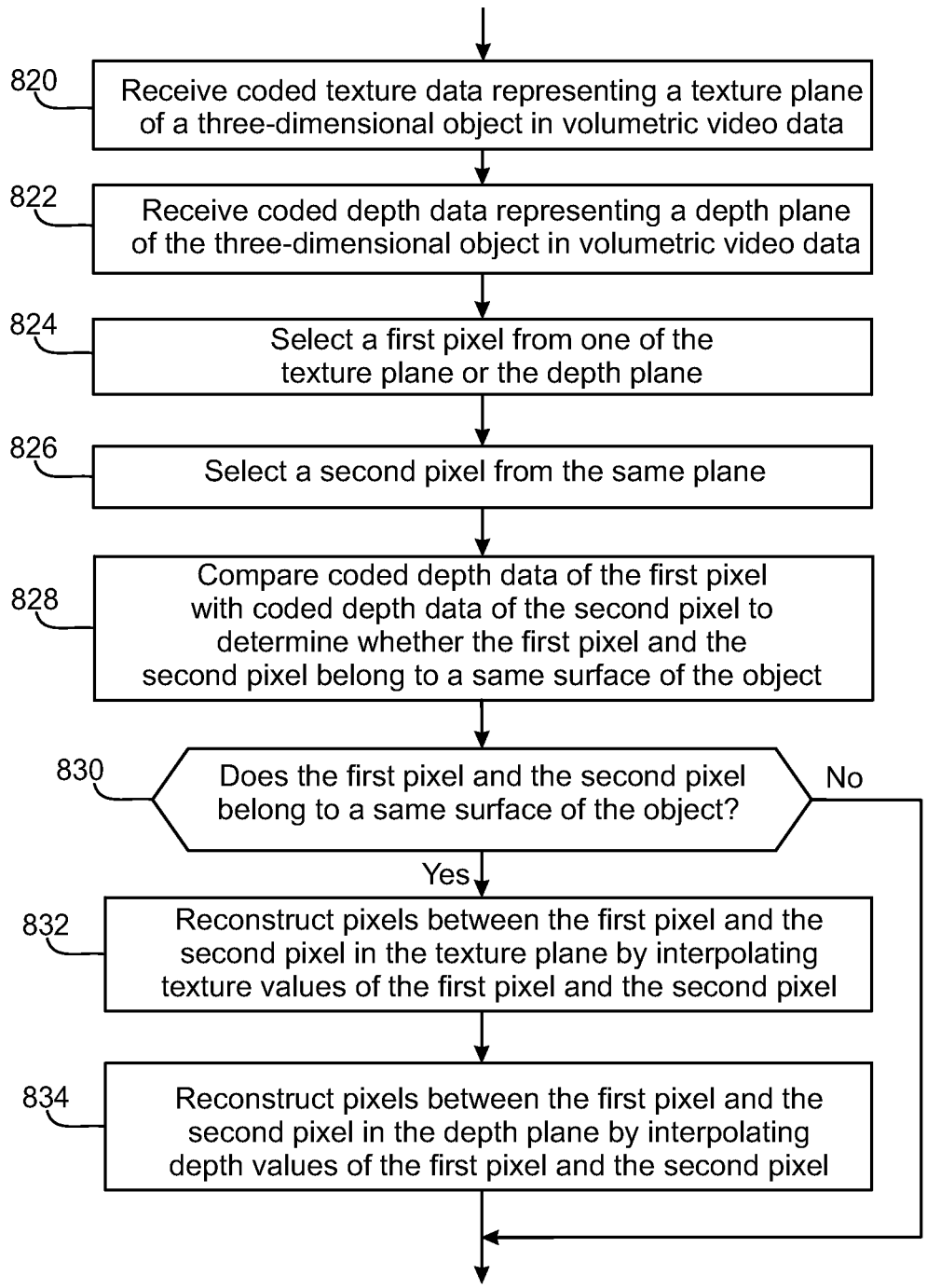

FIGS. 8a and 8b show flow charts for compressing encoding and decoding of a scene of a volumetric video.

In the encoding, in phase 801, volumetric video data is obtained containing information of one or more three-dimensional objects.

In phase 802, the one or more three-dimensional objects are mapped to a two-dimensional plane using a predetermined downsampling factor.

In phase 805, a point of the two-dimensional plane is examined to find out which points of the three-dimensional object is mapped to the same point. This may be performed, for example, back-projecting 803 points of the two-dimensional plane to the three-dimensional plane and using the result in the examination, or by keeping a kind of a record in forward-projecting 804 the points from the three-dimensional object to the two-dimensional plane, wherein the record indicates which 3D points have been projected to the same 2D point.

In phase 806 those points of the three-dimensional object which are mapped to the same point are examined to determine which of them belong to a same surface of the object.

In phase 807 a centre of mass for the surface is determined on the basis of three-dimensional coordinates of the points belonging to the surface.

In phase 808 a depth value of the centre of mass is mapped to the depth plane representing a two-dimensional projection plane of depth data of the three-dimensional object.

In phase 809 the surface is divided to two or more sections.

In phase 810 a colour value for the centre of mass is interpolated from colour values of nearest neighbour points of the centre of mass so that only one neighbour point from each section is taken into account.

In phase 812 the interpolated colour value is used as the colour of the surface in the texture plane.

The steps 803-812 may be repeated 814 until the whole volumetric video has been processed.

In the decoding, in phase 820 the coded texture data representing a texture plane of a three-dimensional object in volumetric video data is received and in phase 822 the coded depth data representing a depth plane of the three-dimensional object in volumetric video data is received.

In phase 824, a first pixel from one of the texture plane or the depth plane is selected and in phase 826, a second pixel from the same plane is selected.

In phase 828, coded depth data of the first pixel is compared with coded depth data of the second pixel to determine whether the first pixel and the second pixel belong to a same surface of the object.

If the comparison indicates in phase 830 that the first pixel and the second pixel belong to a same surface of the object, pixels between the first pixel and the second pixel in the texture plane are reconstructed in phase 832 by interpolating texture values of the first pixel and the second pixel; and pixels between the first pixel and the second pixel in the depth plane are reconstructed in phase 834 by interpolating depth values of the first pixel and the second pixel.

Figure 9A:
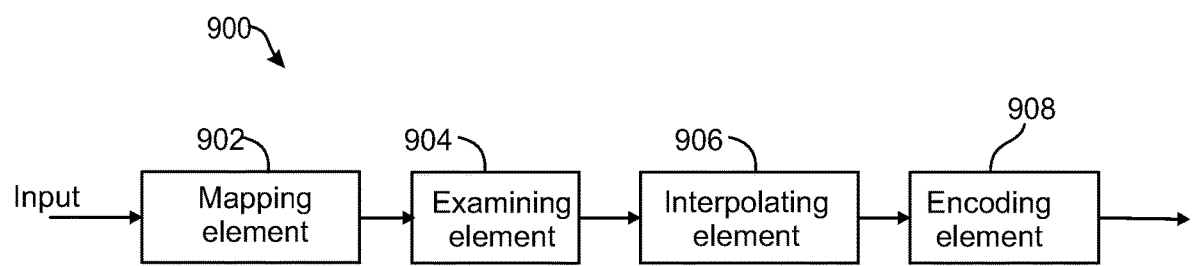
FIG. 9a illustrates an example of an encoding element.

FIG. 9a illustrates an example of an encoding element 900 which may perform the above described encoding operations. Objects of a source volume of a digital scene model may be input to a mapping element 902 which may map depth value of the centre of mass of surfaces to the depth plane. The objects represent the texture data. Information of the detected surfaces is provided to an examining element 904 in which texture data may be examined to find out surfaces of objects. The interpolation element 906 performs the interpolation of colour values of nearest neighbours of the centre of mass within the same surface. Texture and depth data may be provided to an encoding element 908 for subsequent encoding and transmission/storage to a file, for example.

Figure 9B:
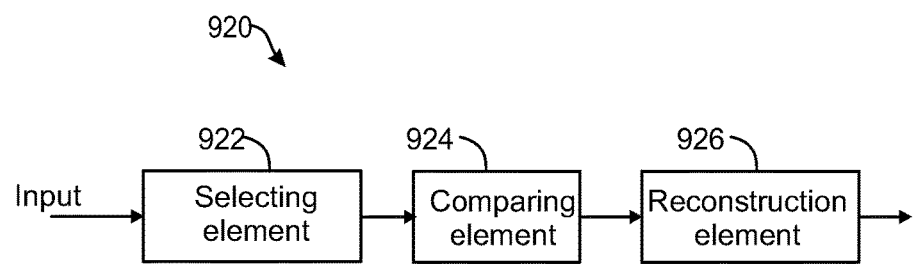
FIG. 9b illustrates an example of a decoding element.

FIG. 9b illustrates an example of a decoding element 920 which may perform the above described decoding operations. Coded texture data representing a texture plane of a three-dimensional object in volumetric video data and coded depth data representing a depth plane of the three-dimensional object in volumetric video data is received and provided to a selecting element 922 to select a first pixel and a second pixel from one of the texture plane or the depth plane. A comparing element 924 compares coded depth data of the first pixel with coded depth data of the second pixel to determine whether the first pixel and the second pixel belong to a same surface of the object. A reconstruction element 926 reconstructs pixels between the first pixel and the second pixel in the texture plane by interpolating texture values of the first pixel and the second pixel and pixels between the first pixel and the second pixel in the depth plane by interpolating depth values of the first pixel and the second pixel when the first pixel and the second pixel belong to a same surface of the object.

In the above, some embodiments have been described with reference to encoding. It needs to be understood that said encoding may comprise one or more of the following: encoding source image data into a bitstream, encapsulating the encoded bitstream in a container file and/or in packet(s) or stream(s) of a communication protocol, and announcing or describing the bitstream in a content description, such as the Media Presentation Description (MPD) of ISO/IEC 23009-1 (known as MPEG-DASH) or the IETF Session Description Protocol (SDP). Similarly, some embodiments have been described with reference to decoding. It needs to be understood that said decoding may comprise one or more of the following: decoding image data from a bitstream, decapsulating the bitstream from a container file and/or from packet(s) or stream(s) of a communication protocol, and parsing a content description of the bitstream, In the above, some embodiments have been described with reference to encoding or decoding texture pictures, geometry pictures and projection geometry information into or from a single bitstream. It needs to be understood that embodiments can be similarly realized when encoding or decoding texture pictures, geometry pictures and projection geometry information into or from several bitstreams that are associated with each other, e.g. by metadata in a container file or media presentation description for streaming.

Although the above examples describe embodiments of the invention operating within a wireless communication device, it would be appreciated that the invention as described above may be implemented as a part of any apparatus comprising a circuitry in which radio frequency signals are transmitted and received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
    receiving coded texture data representing a texture image of a three-dimensional object in volumetric video data, wherein the coded texture data comprises an interpolated colour value for a same surface of the three-dimensional object, wherein the interpolated colour value comprises a color value interpolated for a determined centre of mass for the same surface;
    receiving coded depth data representing a depth image of the three-dimensional object in the volumetric video data;
    selecting a first pixel from one of the texture image or the depth image;
    selecting a second pixel from one of the texture image or the depth image;
    comparing coded depth data of the first pixel with coded depth data of the second pixel to determine whether the first pixel and the second pixel belong to the same surface of the three-dimensional object, wherein the coded depth data of the first pixel comprises a first depth value from the depth image, wherein the coded depth data of the second pixel comprises a second depth value from the depth image;
    determining the first pixel and the second pixel belong to the same surface of the three-dimensional object in response to the coded depth data of the first pixel and the coded depth data of the second pixel being the same or almost the same;

upsampling coordinates of the first pixel to obtain a first point in a three-dimensional space;
upsampling coordinates of the second pixel to obtain a second point in the three-dimensional space; and
reconstructing pixels between the first point and the second point in the three-dimensional space, comprising:
    interpolating texture values of the first pixel and the second pixel in the texture image based, at least partially, on the interpolated colour value for the same surface of the three-dimensional object; and
    interpolating depth values of the first pixel and the second pixel in the depth image.

2. The method according to claim 1 further comprising:
selecting the second pixel among one or more pixels which are neighbours of said first pixel.

3. The method according to claim 1 further comprising:
using a different interpolation factor in the depth image and in the texture image.

4. The method according to claim 1, wherein receiving the coded texture data representing the texture image comprises:
    obtaining the volumetric video data containing information of one or more three-dimensional objects, wherein the one or more three-dimensional objects comprises, at least, the three-dimensional object;
    mapping the one or more three-dimensional objects to a two-dimensional projection plane with a pre-determined vertical and horizontal resolution;
    examining a point in the two-dimensional projection plane to determine which points of the three-dimensional object are mapped to the point to obtain a set of candidate points;
    determining which points of the set of candidate points belong to the same surface to obtain a set of surface points;
    determining the centre of mass for the same surface based, at least partially, on points of the set of surface points;
    mapping a depth value of the centre of mass to the depth image, wherein the depth image comprises a representation of a two-dimensional projection plane of depth data of the three-dimensional object;
    interpolating the colour value for the determined centre of mass from colour values of the points of the set of surface points which are nearest neighbours of the centre of mass; and
    using the interpolated colour value as the colour of the same surface in the texture image.

5. The method according to claim 4 further comprising:
    obtaining the set of candidate points via back-projection of the two-dimensional projection plane with the pre-determined vertical and horizontal resolution to a three-dimensional plane; and
    using a point obtained via the back-projection to construct the set of candidate points.

6. The method according to claim 5, wherein the point obtained via the back-projection is an outmost point projected onto two-dimensional coordinates.

7. The method according to claim 4 further comprising:
dividing the same surface into four quadratic regions.

8. An apparatus comprising:
at least one processor and
at least one non-transitory memory,
said at least one memory stored with code thereon, which when executed by said at least one processor, causes the apparatus to perform at least:
    receive coded texture data representing a texture image of a three-dimensional object in volumetric video data, wherein the coded texture data comprises an interpolated colour value for a same surface of the three-dimensional object, wherein the interpolated colour value comprises
    a color value interpolated for a determined centre of mass for the same surface;
    receive coded depth data representing a depth image of the three-dimensional object in the volumetric video data;
    select a first pixel from one of the texture image or the depth image;
    select a second pixel from one of the texture image or the depth image;
    compare coded depth data of the first pixel with coded depth data of the second pixel to determine whether the first pixel and the second pixel belong to the same surface of the three-dimensional object, wherein the coded depth data of the first pixel comprises a first depth value from the depth image, wherein the coded depth data of the second pixel comprises a second depth value from the depth image;
    determine the first pixel and the second pixel belong to the same surface of the three-dimensional object in response to the coded depth data of the first pixel and the coded depth data of the second pixel being the same or almost the same;
    upsample coordinates of the first pixel to obtain a first point in a three-dimensional space;
    upsample coordinates of the second pixel to obtain a second point in the three-dimensional space; and
    reconstruct pixels between the first point and the second point in the three-dimensional space, comprising:
        interpolating texture values of the first pixel and the second pixel in the texture image based, at least partially, on the interpolated colour value for the same surface of the three-dimensional object; and
        interpolating depth values of the first pixel and the second pixel in the depth image.

9. The apparatus according to claim 8, wherein the apparatus is further caused to:
select the second pixel among one or more pixels which are neighbours of said first pixel.

10. The apparatus according to claim 8, wherein the apparatus is further caused to:
use a different interpolation factor in the depth image and in the texture image.

11. The apparatus according to claim 8, wherein receiving the coded texture data representing the texture image further causes the apparatus to:
    obtain the volumetric video data containing information of one or more three-dimensional objects, wherein the one or more three-dimensional objects comprises, at least, the three-dimensional object;
    map the one or more three-dimensional objects to a two-dimensional projection plane with a pre-determined vertical and horizontal resolution;
    examine a point in the two-dimensional projection plane to determine which points of the three-dimensional object are mapped to the point to obtain a set of candidate points;
    determine which points of the set of candidate points belong to the same surface to obtain a set of surface points;
    determine the centre of mass for the same surface based, at least partially, on points of the set of surface points;

map a depth value of the centre of mass to the depth image, wherein the depth image is configured to represent a two-dimensional projection plane of depth data of the three-dimensional object;

interpolate the colour value for the determined centre of mass from colour values of points of the set of surface points which are nearest neighbours of the centre of mass; and use the interpolated colour value as the colour of the same surface in the texture image.

12. The apparatus according to claim 11, wherein the apparatus is further caused to:

obtain the set of candidate points via back-projection of the two-dimensional projection plane with the predetermined vertical and horizontal resolution to a three-dimensional plane; and use a point obtained via the back-projection to construct the set of candidate points.

13. The apparatus according to claim 11, wherein the point obtained via the back-projection is an outmost point projected onto two-dimensional coordinates.

14. The apparatus according to claim 11, wherein the apparatus is further caused to:

divide the same surface into four quadratic regions.

15. The apparatus according to claim 14, wherein the apparatus is further caused to:

determine in which of the four quadratic regions points in the set of surface points belongs, and determine which point of the points is closest to the centre of mass for respective quadratic regions of the determined quadratic regions, wherein the interpolation of the colour value comprises using closest points of the determined regions.

16. The apparatus according to claim 15, wherein the apparatus is further caused to:

determine the colour value of the centre of mass using distances of the closest points to the centre of mass of the same surface in the interpolation.

17. The apparatus according to claim 11, wherein the apparatus is further caused to:

select a third pixel from the set of candidate points;

determine a three-dimensional location of the third pixel in the volumetric video data;

select a fourth pixel from the set of candidate points;

determine a three-dimensional location of the fourth pixel in the volumetric video data;

determine a gradient on the basis of the three-dimensional location of the third pixel and the three-dimensional location of the fourth pixel;

compare the gradient with a threshold; and exclude the fourth pixel from the set of surface points responsive to the gradient being greater than the threshold.

18. The apparatus according to claim 11, wherein a resolution of the depth image is lower than a resolution of the texture image.

19. A non-transitory computer-readable medium comprising program instructions stored thereon which, when executed with at least one processor, cause the at least one processor to:

receive coded texture data representing a texture image of a three-dimensional object in volumetric video data, wherein the coded texture data comprises an interpolated colour value for a same surface of the three-dimensional object, wherein the interpolated colour value comprises a color value interpolated for a determined centre of mass for the same surface;

receive coded depth data representing a depth image of the three-dimensional object in the volumetric video data;

cause selection of a first pixel from one of the texture image or the depth image;

cause selection of a second pixel from one of the texture image or the depth image;

compare coded depth data of the first pixel with coded depth data of the second pixel to determine whether the first pixel and the second pixel belong to the same surface of the three-dimensional object, wherein the coded depth data of the first pixel comprises a first depth value from the depth image, wherein the coded depth data of the second pixel comprises a second depth value from the depth image;

determine the first pixel and the second pixel belong to the same surface of the three-dimensional object in response to the coded depth data of the first pixel and the coded depth data of the second pixel being the same or almost the same;

cause upsampling of coordinates of the first pixel to obtain a first point in a three-dimensional space;

cause upsampling of coordinates of the second pixel to obtain a second point in the three-dimensional space; and cause reconstruction of pixels between the first point and the second point in the three-dimensional space, comprising:

cause interpolating of texture values of the first pixel and the second pixel in the texture image based, at least partially, on the interpolated colour value for the same surface of the three-dimensional object; and cause interpolating of depth values of the first pixel and the second pixel in the depth image.

* * * * *